(12) United States Patent
Huang

(10) Patent No.: US 9,509,806 B2
(45) Date of Patent: Nov. 29, 2016

(54) TECHNIQUES FOR SUPPORTING WI-GIG BUS EXTENSION AND WI-GIG DISPLAY EXTENSION AS PERIPHERAL FUNCTION PROTOCOLS IN WIRELESS DOCKING

(71) Applicant: QUALCOMM Incorporated, San Diego, CA (US)

(72) Inventor: Xiaolong Huang, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 138 days.

(21) Appl. No.: 14/567,444

(22) Filed: Dec. 11, 2014

(65) Prior Publication Data

US 2015/0173001 A1   Jun. 18, 2015

Related U.S. Application Data

(60) Provisional application No. 61/917,330, filed on Dec. 17, 2013.

(51) Int. Cl.
*H04L 29/06* (2006.01)
*H04L 29/08* (2006.01)
*H04W 84/18* (2009.01)

(52) U.S. Cl.
CPC ............. *H04L 69/18* (2013.01); *H04L 67/16* (2013.01); *H04L 67/28* (2013.01); *H04W 84/18* (2013.01)

(58) Field of Classification Search
CPC . G06F 1/1632; H04W 76/023; H04W 4/008; H04M 1/7253
See application file for complete search history.

(56) References Cited

U.S. PATENT DOCUMENTS

| | | | |
|---|---|---|---|
| 2013/0145050 A1 | 6/2013 | Huang et al. | |
| 2013/0163489 A1* | 6/2013 | Lee | H04W 4/18 370/310 |
| 2013/0229574 A1* | 9/2013 | MacInnis | H04N 21/4122 348/497 |
| 2014/0351477 A1* | 11/2014 | Lee | G06F 1/1632 710/303 |
| 2015/0056920 A1* | 2/2015 | Huttunen | H04B 7/26 455/41.2 |
| 2015/0149679 A1* | 5/2015 | Mostafa | H04W 76/021 710/304 |
| 2015/0205747 A1* | 7/2015 | Dees | H04M 1/7253 710/303 |
| 2015/0319598 A1* | 11/2015 | Vedula | H04W 8/005 455/41.2 |

OTHER PUBLICATIONS

ISA/EPO, International Search Report and Written Opinion of the International Searching Authority, Int'l. App. No. PCT/US2014/070006, Mar. 18, 2015, European Patent Office, Rijswijk, NL 12 pgs.

* cited by examiner

*Primary Examiner* — Jung Park
(74) *Attorney, Agent, or Firm* — Holland & Hart LLP

(57) ABSTRACT

Methods, systems, and apparatuses are described for wireless communication. In one method, a request may be received at a Wi-Fi docking center (WDC) regarding one or more peripheral function protocols (PFPs) supported by the WDC, and a response message indicating whether the WDC supports at least a Wi-Gig Bus Extension (WBE) as a PFP or a Wi-Gig Display Extension (WDE) as a PFP may be transmitted. In another method, a request may be transmitted to a WDC regarding one or more PFPs supported by the WDC, and a response message may be received from the WDC. The request may be transmitted using a first peer-to-peer (P2P) connection. The response message may indicate whether the WDC supports at least a WBE as a PFP or a WDE as a PFP.

64 Claims, 16 Drawing Sheets

TECHNIQUES FOR SUPPORTING WI-GIG BUS EXTENSION AND WI-GIG DISPLAY EXTENSION AS PERIPHERAL FUNCTION PROTOCOLS IN WIRELESS DOCKING

CROSS REFERENCES

The present application for patent claims priority to U.S. Provisional Patent Application No. 61/917,330 by Xiaolong Huang, entitled "TECHNIQUES FOR SUPPORTING WI-GIG BUS EXTENSION AND WI-GIG DISPLAY EXTENSION AS PERIPHERAL FUNCTION PROTOCOLS IN WIRELESS DOCKING," filed Dec. 17, 2013, and assigned to the assignee hereof.

BACKGROUND

Field of the Disclosure

The following relates generally to wireless communication, and more specifically to wireless docking centers for wireless devices.

Description of Related Art

Wireless docking centers, which are also referred to as docking centers, wireless docking stations, docking stations, or docks, may be used to wirelessly connect wireless devices to various peripheral devices, including monitors, keyboards, mice, printers, scanners, cameras, etc. Wireless docking centers may be used by wireless devices (or wireless dockees) such as computers (e.g., laptop computers, netbook computers, tablet computers, etc.), cellular phones (including smartphones), personal digital assistants (PDAs), internet appliances, gaming consoles, e-readers, etc.

In some cases, a wireless docking center may be able to communicate with peripherals using a number of peripheral function protocols (PFPs) known to the wireless docking center.

SUMMARY

The described features generally relate to one or more improved methods, systems, and/or apparatuses for wireless communication between a wireless docking center (WDC) and a wireless device (e.g., a wireless dockee or a mobile device). More particularly, the described features relate to techniques to support Wi-Gig Bus Extension (WBE) as a peripheral function protocol (PFP) and Wi-Gig Display Extension (WDE) as a PFP in wireless docking.

In a first set of illustrative embodiments, a method for wireless communication is described. In one configuration, the method may include receiving, at a Wi-Fi docking center (WDC), a request regarding one or more peripheral function protocols (PFPs) supported by the WDC. The method may also include transmitting a response message indicating whether the WDC supports at least a Wi-Gig Bus Extension (WBE) as a PFP, or a Wi-Gig Display Extension (WDE) as a PFP, or a combination thereof.

In some embodiments, the response message may include a data type field. The data type field may include a value representing a PFP supported by the WDC. The value of the data type field may include an indication that the WDC supports the WBE as a PFP and/or the value of the data type field may include an indication that the WDC supports the WDE as a PFP.

In some examples, the response message may include a simple information element or a detailed information element. The simple information element may include a list of PFPs supported by the WDC. The detailed information element may include a list of PFPs supported by the WDC and additional information regarding a particular PFP supported by the WDC.

When included in the response message, the detailed information element may include a discovery information subelement. The discovery information subelement may include a service information element and a network role information element. In some cases, the method may include determining whether the particular PFP supported by the WDC is deployed using a Wi-Fi direct services (WFDS) application services platform (ASP). Upon determining that the particular PFP supported by the WDC is not deployed using the WFDS ASP, a value of the service information element may be set to a null value. Upon determining that the particular PFP supported by the WDC is deployed using the WFDS ASP, the value of the service information element may be set to a non-null value. The non-null value may be the same value as a service information attribute of the WFDS ASP. In some cases, the discovery information subelement may further include an advertisement identification information element and a service name information element, and upon determining that the particular PFP supported by the WDC is deployed using the WFDS ASP, a value of the advertisement identification information element may be set to an WFDS advertisement identification of the particular PFP, and a value of the service name information element may be set to a full service name of the WFDS ASP.

When the response message includes a network role information element, the network role information element may be set to a first value when the WDC intends to assume a network role of a group owner of a peer-to-peer session providing the particular PFP, and may be set to a second value when the WDC intends to assume a network role of a client in the peer-to-peer session providing the particular PFP.

In a second set of illustrative embodiments, an apparatus for wireless communication is described. In one configuration, the apparatus may include means for receiving, at a WDC, a request regarding one or more PFPs supported by the WDC. The apparatus may also include means for transmitting a response message indicating whether the WDC supports at least a WBE as a PFP, or a WDE as a PFP, or a combination thereof. In certain examples, the apparatus may further include means for implementing one or more aspects of the method for wireless communication described above with respect to the first set of illustrative embodiments.

In a third set of illustrative embodiments, another apparatus for wireless communication is described. In one configuration, the apparatus may include a processor, memory in electronic communication with the processor, and instructions stored in the memory. The instructions may be executable by the processor to receive, at a WDC, a request regarding one or more PFPs supported by the WDC. The instructions may also be executable by the processor to transmit a response message indicating whether the WDC supports at least a WBE as a PFP, or a WDE as a PFP, or a combination thereof. In certain examples, the instructions may also be executable by the processor to implement one or more aspects of the method for wireless communication described above with respect to the first set of illustrative embodiments.

In a fourth set of illustrative embodiments, a computer program product for wireless communication is described. In one configuration, the computer program product may include a non-transitory computer-readable medium storing instructions executable by a processor to receive, at a WDC, a request regarding one or more PFPs supported by the WDC. The instructions may also be executable by the processor to transmit a response message indicating whether the WDC supports at least a WBE as a PFP, or a WDE as a PFP, or a combination thereof. In certain examples, the instructions may also be executable by the processor to implement one or more aspects of the method for wireless communication described above with respect to the first set of illustrative embodiments.

In a fifth set of illustrative embodiments, another method for wireless communication is described. In one configuration, the method may include transmitting a request to a WDC regarding one or more PFPs supported by the WDC, and receiving a response message from the WDC. The request may be transmitted using a first peer-to-peer (P2P) connection. The response message may indicate whether the WDC supports at least a WBE as a PFP, or a WDE as a PFP, or a combination thereof.

In some examples, the method may include selecting a particular PFP supported by the WDC based at least in part on the response message, and connecting to the particular PFP supported by the WDC.

In some embodiments, the response message may include a network role information element. In these embodiments, the method may include identifying a value of the network role information element, where the value indicates a network role to be assumed by the WDC for the first P2P connection, and comparing the value of the network role information element to a value of a current network role assumed by a wireless device. When the value of the network role information element matches the value of the current network role assumed by the wireless device, the method may include disconnecting from the first P2P connection, and establishing a second P2P connection to connect to the particular PFP supported by the WDC. When the value of the network role information element is different than the value of the current network role assumed by the wireless device, the method may include using the first P2P connection to connect to the particular PFP supported by the WDC.

In a sixth set of illustrative embodiments, another apparatus for wireless communication is described. In one configuration, the apparatus may include means for transmitting a request to a WDC regarding one or more PFPs supported by the WDC, and means for receiving a response message from the WDC. The request may be transmitted using a first P2P connection. The response message may indicate whether the WDC supports at least a WBE as a PFP, or a WDE as a PFP, or a combination thereof. In certain examples, the apparatus may further include means for implementing one or more aspects of the method for wireless communication described above with respect to the fifth set of illustrative embodiments.

In a seventh set of illustrative embodiments, another apparatus for wireless communication is described. The apparatus may include a processor, memory in electronic communication with the processor, and instructions stored in the memory. The instructions may be executable by the processor to transmit a request to a WDC regarding one or more PFPs supported by the WDC, and to receive a response message from the WDC. The request may be transmitted using a first P2P connection. The response message may indicate whether the WDC supports at least a WBE as a PFP, or a WDE as a PFP, or a combination thereof. In certain examples, the instructions may also be executable by the processor to implement one or more aspects of the method for wireless communication described above with respect to the fifth set of illustrative embodiments.

In an eighth set of illustrative embodiments, another computer program product for wireless communication is described. The computer program product may include a non-transitory computer-readable medium storing instructions executable by a processor to transmit a request to a WDC regarding one or more PFPs supported by the WDC, and to receive a response message from the WDC. The request may be transmitted using a first P2P connection. The response message may indicate whether the WDC supports at least a WBE as a PFP, or a WDE as a PFP, or a combination thereof. In certain examples, the instructions may also be executable by the processor to implement one or more aspects of the method for wireless communication described above with respect to the fifth set of illustrative embodiments.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
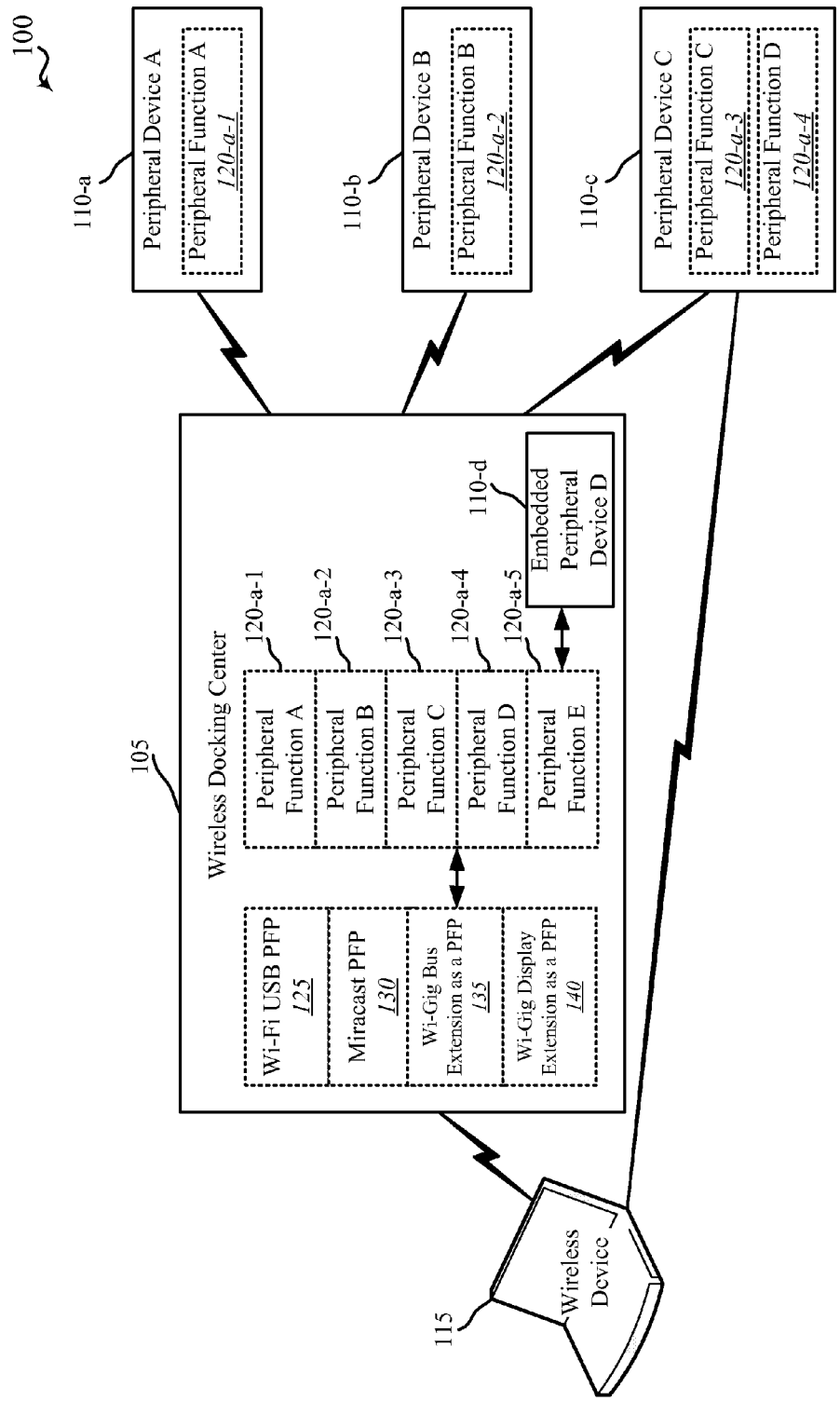
FIG. 1 shows a block diagram of a wireless communication system, in accordance with various aspects of the present disclosure.

Methods, systems, and apparatuses are described for supporting WBE as a PFP and WDE as a PFP in wireless docking (e.g., wireless docking over a WLAN network or Wi-Fi network). WBE and WDE have previously been unsupported in wireless docking, but may be useful in supporting wireless communication between wireless devices (e.g., wireless dockees or mobile devices) and peripheral devices making use of WBE or WDE.

A WLAN network or Wi-Fi network may refer to a network that is based on the protocols described in the various IEEE 802.11 standards (e.g., IEEE 802.11a/g, 802.11n, 802.11 ac, 802.11 ad, 802.11 ah, etc.), for example. However, the same or similar techniques may also be used in conjunction with another type of wireless network (e.g., a cellular network). For example, the same or similar techniques may be used in conjunction with cellular networks, Peer-to-Peer (P2P) networks, ad hoc networks, satellite communication networks, and other networks. The terms "network" and "system" are often used interchangeably in this description. These wireless communication systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communication is conducted according to a standardized implementation of at least one radio communication technology called a Radio Access Technology (RAT). A wireless communication system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), Wi-Fi, IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates a wireless communication system 100, in accordance with various aspects of the present disclosure. The wireless communication system 100 may include a wireless docking center (WDC) 105, peripheral devices 110 (e.g., Peripheral Device A 110-a, Peripheral Device B 110-b, Peripheral Device C 110-c, and/or Embedded Peripheral Device D 110-d), and a wireless device 115 (e.g., a wireless dockee or mobile device). The peripheral devices 110 may be electronic devices that each provide at least one peripheral function (e.g., Peripheral Function A 120-a-1, Peripheral Function B 120-a-2, Peripheral Function C 120-a-3, Peripheral Function D 120-a-4, or Peripheral Function E 120-a-5). For example, the peripheral device 110-a may be a mouse with a peripheral function of controlling a pointer on a graphical user interface. In some embodiments, the peripheral device 110-b may be a keyboard with a peripheral function of user input. The peripheral device 110-c may be a multi-function printer, for example, with peripheral functions of printing and scanning Additionally or alternatively, the WDC 105 may include embedded peripherals, such as the peripheral device 110-d. Some or all of the peripheral devices 110 may be connected to and/or in communication with the WDC 105.

The wireless device 115 may wirelessly connect to the WDC 105, for example, over a Wi-Fi network. The wireless device 115 may seek out or connect to the WDC 105 based on the peripheral functions available via the WDC 105. Thus, the WDC 105 may advertise the peripheral functions, and thus the peripheral devices available, to a wireless device 115 via the WDC 105. Once connected to (e.g., docked) to the WDC 105, the wireless device 115 may exploit the peripheral functions available through the WDC 105.

The wireless docking station 105 may also support a variety of PFPs. For example, the wireless docking station 105 may support Miracast 130, Wi-Fi universal serial bus (Wi-Fi USB) 125, IEEE 802.1 lad ("Wi-Gig", including WBE 135 and/or WDE 140), Universal Plug and Play (UPnP), and/or Wi-Fi Direct Services Application Service Platform (WFDS ASP). In some cases, the wireless device 115 may connect to (or dock with) the WDC 105 and use a supported PFP of the WDC 105 to use a peripheral function available via the device WDC 105. In other cases, the wireless device 115 may further discover and connect to a PFP supported by the WDC 105 (e.g., WBE 135 and/or WDE 140), to in turn connect to a peripheral function available via the WDC 105.

Figure 2:
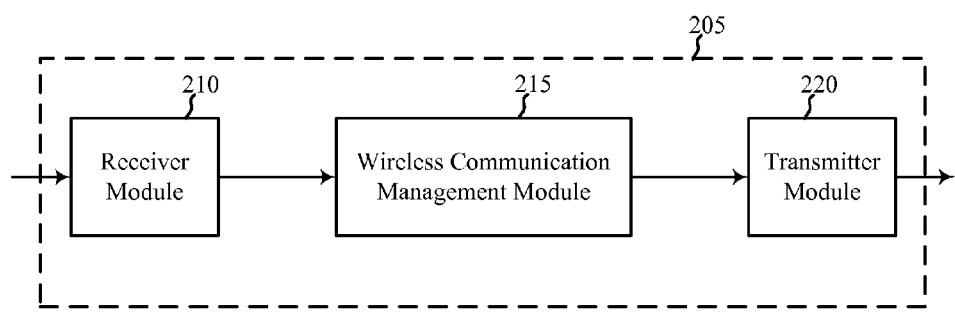
FIG. 2 shows a block diagram of an apparatus for wireless communication, in accordance with various aspects of the present disclosure.

FIG. 2 shows a block diagram 200 of an apparatus 205 for wireless communication, in accordance with various aspects of the present disclosure. In some embodiments, the apparatus 205 may be an example of at least one aspect of the WDC 105 or wireless device 115 described with reference to FIG. 1. The apparatus 205 may also be a processor. The apparatus 205 may include a receiver module 210, a wireless communication management module 215, and/or a transmitter module 220. Each of these components may be in communication with each other.

The components of the apparatus 205 may, individually or collectively, be implemented using at least one application-specific integrated circuit (ASIC) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by a general or application-specific processor.

In some embodiments, the receiver module 210 may be or include a radio frequency (RF) receiver such as a Wi-Fi receiver. The receiver module 210 may also include other receivers, such as a WLAN receiver and/or WWAN receiver (e.g., a cellular receiver). The receiver module 210 may be used to receive various types of data and/or control signals (i.e., transmissions) over communication links (e.g., physical channels) of a wireless communication system such as the wireless communication system 100 described with reference to FIG. 1.

In some embodiments, the transmitter module 220 may be or include an RF transmitter such as a Wi-Fi transmitter. The transmitter module 220 may also include other transmitters, such as a WLAN transmitter and/or WWAN transmitter (e.g., a cellular transmitter). The transmitter module 220 may be used to transmit various types of data and/or control signals (i.e., transmissions) over communication links (e.g., physical channels) of a wireless communication system such as the wireless communication system 100.

In some embodiments, the wireless communication management module 215 may be used to manage connections to at least one PFP. In some cases, the apparatus 205 may be a WDC, such as the WDC 105 described with reference to FIG. 1, and the wireless communication management module 215 may manage the wireless connection(s) of wireless devices (e.g., mobile devices) to peripherals and/or PFPs supported by the WDC. In other cases, the apparatus 205 may be a wireless device, such as one of the wireless devices 115 described with reference to FIG. 1, and the wireless communication management module 215 may manage the wireless connection(s) of the wireless device to peripherals and/or PFPs supported by at least one WDC. The PFP(s) may in some cases include a WBE as a PFP and/or a WDE as a PFP. Each PFP may enable a wireless service to use at least one peripheral device (e.g., displays, printers, keyboards, storage devices, etc.) via at least one WDC.

Figure 3:
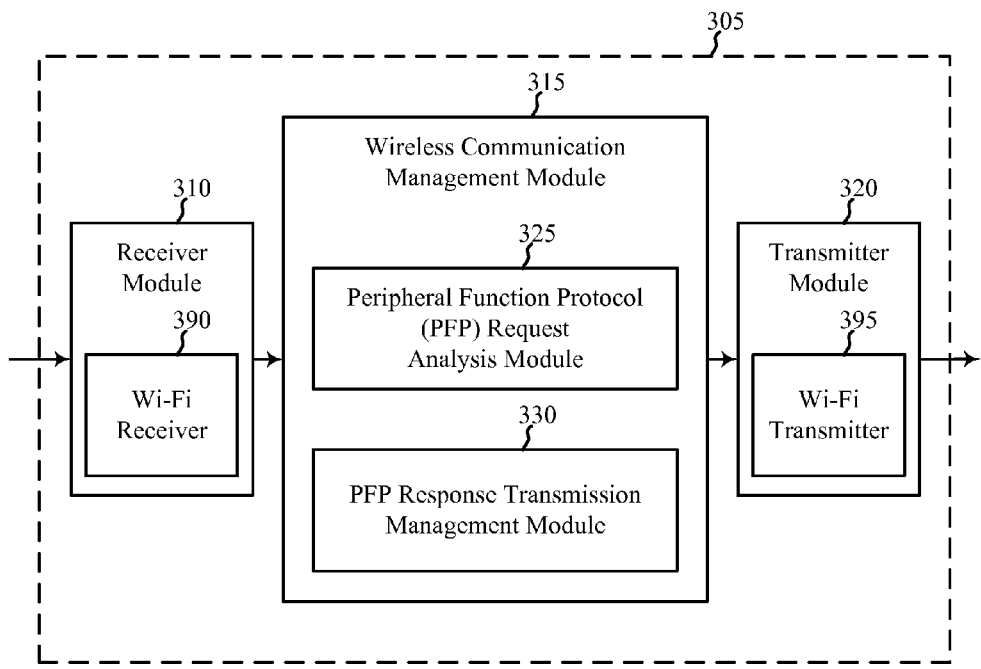
FIG. 3 shows a block diagram of an apparatus (e.g., a WDC) for wireless communication, in accordance with various aspects of the present disclosure.

FIG. 3 shows a block diagram 300 of an apparatus 305 (e.g., a WDC) for wireless communication, in accordance with various aspects of the present disclosure. In some embodiments, the apparatus 305 may be an example of aspects of the WDC 105 described with reference to FIG. 1 and/or aspects of the apparatus 205 described with reference to FIG. 2. The apparatus 305 may also be a processor. The apparatus 305 may include a receiver module 310, a wireless communication management module 315, and/or a transmitter module 320. Each of these components may be in communication with each other.

The components of the apparatus 305 may, individually or collectively, be implemented using at least one ASIC adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by at least one general or application-specific processor.

In some embodiments, the receiver module 310 may be or include an RF receiver such as a Wi-Fi receiver 390. The receiver module 310 may also include other receivers, such as a WLAN receiver and/or WWAN receiver (e.g., a cellular receiver). The receiver module 310 may be used to receive various types of data and/or control signals (i.e., transmissions) over communication links (e.g., physical channels) of a wireless communication system such as the wireless communication system 100 described with reference to FIG. 1.

In some embodiments, the transmitter module 320 may be or include an RF transmitter such as a Wi-Fi transmitter 395. The transmitter module 320 may also include other transmitters, such as a WLAN transmitter and/or WWAN transmitter (e.g., a cellular transmitter). The transmitter module 320 may be used to transmit various types of data and/or control signals (i.e., transmissions) over communication links (e.g., physical channels) of a wireless communication system such as the wireless communication system 100.

In some embodiments, the wireless communication management module 315 may be an example of aspects of the wireless communication management module 215 described with reference to FIG. 2 and may include a PFP request analysis module 325 and/or a PFP response transmission management module 330. Each of these components may be in communication with each other.

In some examples, the PFP request analysis module 325 may be used to receive a request regarding at least one PFP supported by the apparatus 305. The request may be received, for example, via the Wi-Fi receiver 390 of the receiver module 310.

In some examples, the PFP response transmission management module 330 may be used to transmit a response message indicating whether the WDC supports at least a WBE as a PFP, or a WDE as a PFP, or a combination thereof.

The response message may be transmitted, for example, via the Wi-Fi transmitter 395 of the transmitter module 320.

The response message transmitted by the PFP response transmission management module 330 may in some cases include a data type field. The data type field may include a value representing a PFP supported by the apparatus 305. When the apparatus 305 supports the WBE as a PFP, the value of the data type field may indicate that the apparatus 305 supports the WBE as a PFP (e.g., the data type field may take the form of <peripheralFunctionProtocolName>=wbe). When the apparatus 305 supports the WDE as a PFP, the value of the data type field may indicate that the apparatus 305 supports the WDE as a PFP (e.g., the data type field may take the form of <peripheralFunctionProtocolName>=wde). In some cases, the response message transmitted by the PFP response transmission management module 330 may include more than one data type field, with respective values indicating that the apparatus 305 supports both the WBE and the WDE.

The response message transmitted by the PFP response transmission management module 330 may in some cases include a simple information element (IE; e.g., <pfpSimpleInfo>) or a detailed IE (e.g., <pfpDetailedInfo>). The simple IE may include a list of PFPs supported by the apparatus 305, or other information instead of or in addition to the list of PFPs supported by the apparatus 305. The detailed IE may include information similar to the simple IE as well as additional information regarding a particular PFP supported by the apparatus 305.

In some embodiments, the PFP request analysis module 325 may be used to receive (e.g., from a wireless device) a request regarding PFPs supported by the apparatus 305, and the PFP response transmission management module 330 may be used to transmit a response message including a simple IE. The PFP request analysis module 325 may be subsequently used to receive (e.g., from the wireless device) a request regarding a particular one of the PFPs (e.g., a particular PFP) supported by the apparatus 305, and the PFP response transmission management module 330 may be used to transmit a response message including a detailed IE.

Figure 4:
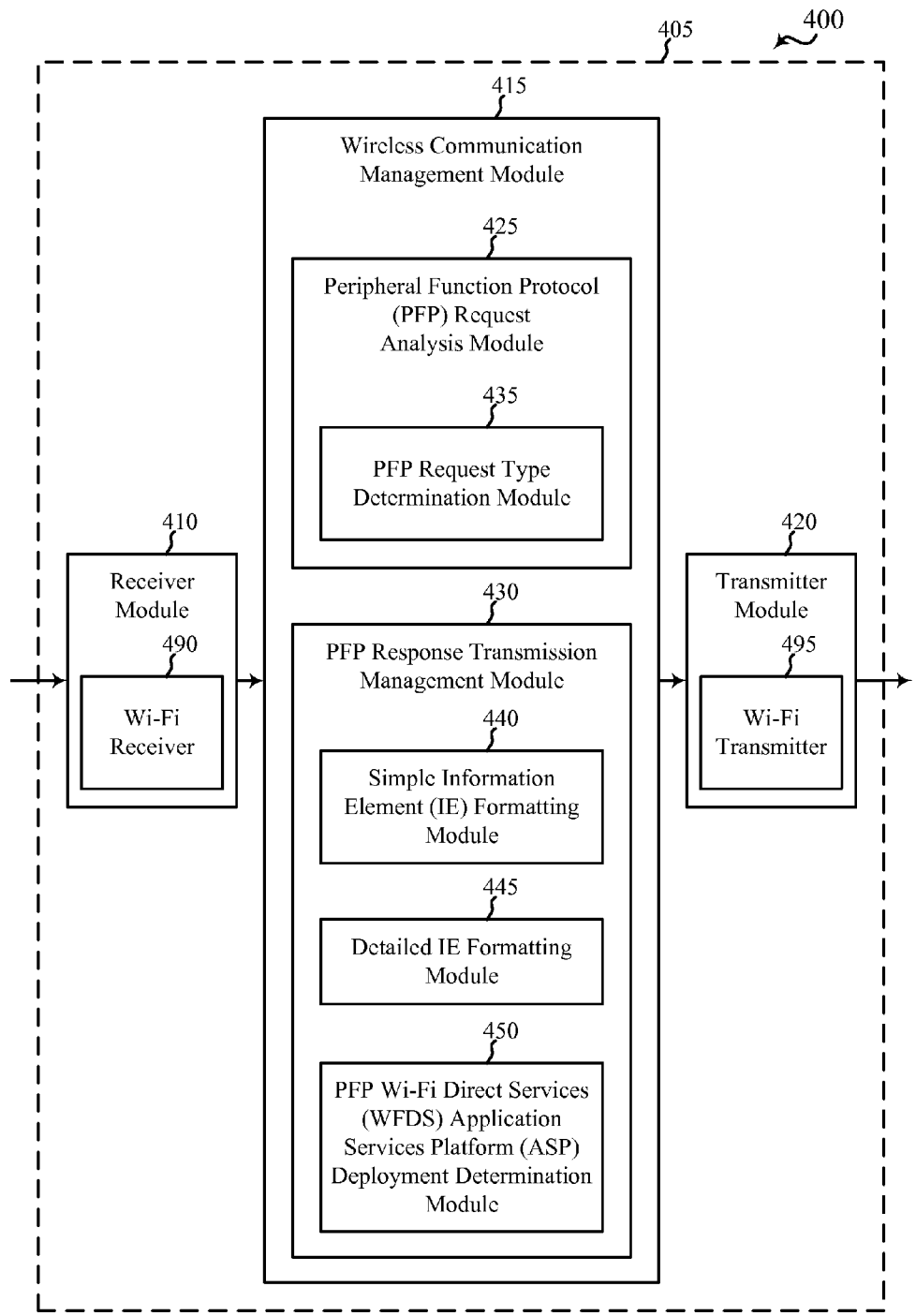
FIG. 4 shows a block diagram of an apparatus (e.g., a WDC) for wireless communication, in accordance with various aspects of the present disclosure.

FIG. 4 shows a block diagram 400 of an apparatus 405 (e.g., a WDC) for wireless communication, in accordance with various aspects of the present disclosure. In some embodiments, the apparatus 405 may be an example of aspects of the WDC 105 described with reference to FIG. 1 and/or aspects of one of the apparatuses 205 and/or 305 described with reference to FIGS. 2 and/or 3. The apparatus 405 may also be a processor. The apparatus 405 may include a receiver module 410, a wireless communication management module 415, and/or a transmitter module 420. Each of these components may be in communication with each other.

The components of the apparatus 405 may, individually or collectively, be implemented using at least one ASIC adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by at least one general or application-specific processor.

In some embodiments, the receiver module 410 may be or include an RF receiver such as a Wi-Fi receiver 490. The receiver module 410 may also include other receivers, such as a WLAN receiver and/or WWAN receiver (e.g., a cellular receiver). The receiver module 410 may be used to receive various types of data and/or control signals (i.e., transmissions) over communication links (e.g., physical channels) of a wireless communication system such as the wireless communication system 100 described with reference to FIG. 1.

In some embodiments, the transmitter module 420 may be or include an RF transmitter such as a Wi-Fi transmitter 495. The transmitter module 420 may also include other transmitters, such as a WLAN transmitter and/or WWAN transmitter (e.g., a cellular transmitter). The transmitter module 420 may be used to transmit various types of data and/or control signals (i.e., transmissions) over communication links (e.g., physical channels) of a wireless communication system such as the wireless communication system 100.

In some embodiments, the wireless communication management module 415 may be an example of aspects of the wireless communication management module 215 and/or 315 described with reference to FIGS. 2 and/or 3 and may include a PFP request analysis module 425 and/or a PFP response transmission management module 430. Each of these components may be in communication with each other.

In some examples, the PFP request analysis module 425 may be used to receive a request regarding at least one PFP supported by the apparatus 405. The request may be received, for example, via the Wi-Fi receiver 490 of the receiver module 410.

The PFP request analysis module 425 may in some cases include a PFP request type determination module 435. The PFP request type determination module 435 may be used, for example, to determine a PFP request type. The PFP request type may be a request regarding PFPs supported by the apparatus 405, or a request regarding a particular PFP.

In some examples, the PFP response transmission management module 430 may be used to transmit a response message indicating whether the WDC supports at least a WBE as a PFP, or a WDE as a PFP, or a combination thereof. The response message may be transmitted, for example, via the Wi-Fi transmitter 495 of the transmitter module 420.

The PFP response transmission management module 430 may in some cases include a simple IE formatting module 440, a detailed IE formatting module 445, and/or a PFP Wi-Fi Direct Services (WFDS) Application Services Platform (ASP) deployment determination module 450. Each of these components may be in communication with each other.

When the PFP request type determination module 435 determines that a received PFP request is a request regarding PFPs supported by the apparatus 405, the PFP response transmission management module 430 may use the simple IE formatting module 440 to format a simple IE for a response message. When the PFP request type determination module 435 determines that a received PFP request is a request regarding a particular PFP, the PFP response transmission management module 430 may use the detailed IE formatting module 445 to format a detailed IE for a response message. In either case, the response message transmitted by the PFP response transmission management module 430 may include a data type field. The data type field may include a value representing a PFP supported by the apparatus 405. When the apparatus 405 supports the WBE as a PFP, the value of the data type field may indicate that the apparatus 405 supports the WBE as a PFP (e.g., the data type field may take the form of <peripheralFunctionProtocolName>=wbe). When the apparatus 405 supports the WDE as a PFP, the value of the data type field may indicate that the apparatus 405 supports the WDE as a PFP (e.g., the data type field may take the form of <peripheralFunctionProtocolName>=wde). When the PFP request received by the apparatus 405 is a request regarding PFPs supported by the apparatus 405, the response message transmitted by the PFP response transmission management module 430 may include more than one data type field, with respective values indicating that the apparatus 305 supports both the WBE and the WDE. When the PFP request received by the apparatus 405 is a request regarding a particular PFP, the response message transmitted by the PFP response transmission management module 430 may include a single data type field corresponding to the particular PFP.

In some examples, the simple IE formatting module 440 may format a simple IE (e.g., <pfpSimpleInfo>) for transmission in a response message. The simple IE may include a list of PFPs supported by the apparatus 405.

In some examples, the detailed IE formatting module 445 may format a detailed IE (e.g., <pfpDetailedInfo>) for transmission in a response message. The detailed IE may include additional information regarding a particular PFP supported by the apparatus 405. The detailed IE may in some cases include a discovery information subelement (e.g., <discoveryInfo>) including a service IE (e.g., <serviceInfo>), a network role IE (e.g., <networkRole>), a service advertisement identification IE (e.g., <advertisementId>), and/or a service name IE (e.g., <serviceName>).

When the PFP response transmission management module 430 needs to transmit a response message including a detailed IE, the detailed IE formatting module 445 may invoke the PFP WFDS ASP deployment determination module 450 to determine whether a particular PFP that is the subject of a PFP request is deployed using a WFDS ASP. When the PFP WFDS ASP deployment determination module 450 determines that the particular PFP is not deployed using the WFDS ASP, a value of the service IE (e.g., <serviceInfo>) of the discovery information subelement of the detailed IE of a response message may be set to a null value. However, when the PFP WFDS ASP deployment determination module 450 determines that the particular PFP is deployed using the WFDS ASP, the value of the service IE may be set to a non-null value. The non-null value may be the same value as a service information attribute of the WFDS ASP (e.g., the same value as the <service_information> attribute of the WFDS Advertise Service for the particular PFP).

When it is determined that the particular PFP is deployed using the WFDS ASP, the value of the advertisement identification IE may be set to a WFDS advertisement identification of the particular PFP, and the value of the service name IE may be set to a full service name of the WFDS ASP.

The PFP response transmission management module 430 may in some cases determine whether the apparatus 405 intends to assume a network role of a group owner of a P2P session providing the particular PFP. When the apparatus 405 intends to assume a network role of the group owner, the PFP response transmission management module 430 may set a value of the network role IE to a first value (e.g., a value corresponding to a network role of a group owner). Otherwise, the PFP response transmission management module 430 may set the value of the network role IE to a second value (e.g., a value corresponding to a network role of a client).

In some embodiments, the PFP request analysis module 425 may be used to receive (e.g., from a wireless device) a request regarding PFPs supported by the apparatus 405, and the PFP response transmission management module 430 may then be used to transmit a response message including a simple IE. The PFP request analysis module 425 may be subsequently used to receive (e.g., from the wireless device) a request regarding a particular one of the PFPs (e.g., a particular PFP) supported by the apparatus 405, and the PFP response transmission management module 430 may then be used to transmit a response message including a detailed IE.

Figure 5:
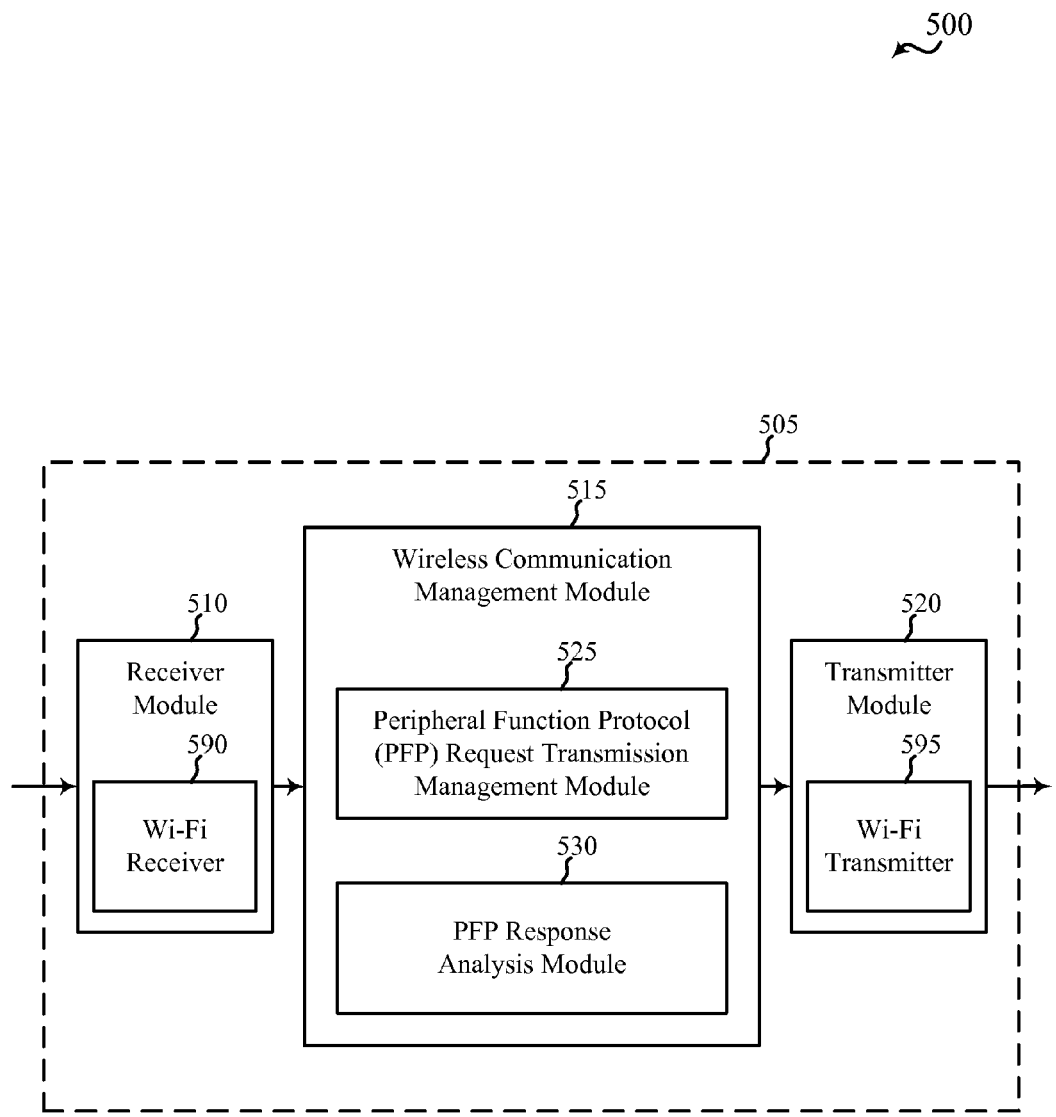
FIG. 5 shows a block diagram of an apparatus (e.g., a wireless dockee) for wireless communication, in accordance with various aspects of the present disclosure.

FIG. 5 shows a block diagram 500 of an apparatus 505 (e.g., a wireless dockee) for wireless communication, in accordance with various aspects of the present disclosure. In some embodiments, the apparatus 505 may be an example of aspects of the wireless device 115 described with reference to FIG. 1 and/or aspects of the apparatus 205 described with reference to FIG. 2. The apparatus 505 may also be a processor. The apparatus 505 may include a receiver module 510, a wireless communication management module 515, and/or a transmitter module 520. Each of these components may be in communication with each other.

The components of the apparatus 505 may, individually or collectively, be implemented using at least one ASIC adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by at least one general or application-specific processor.

In some embodiments, the receiver module 510 may be or include an RF receiver such as a Wi-Fi receiver 590. The receiver module 510 may also include other receivers, such as a WLAN receiver and/or WWAN receiver (e.g., a cellular receiver). The receiver module 510 may be used to receive various types of data and/or control signals (i.e., transmissions) over communication links (e.g., physical channels) of a wireless communication system such as the wireless communication system 100 described with reference to FIG. 1.

In some embodiments, the transmitter module 520 may be or include an RF transmitter such as a Wi-Fi transmitter 595. The transmitter module 520 may also include other transmitters, such as a WLAN transmitter and/or WWAN transmitter (e.g., a cellular transmitter). The transmitter module 520 may be used to transmit various types of data and/or control signals (i.e., transmissions) over communication links (e.g., physical channels) of a wireless communication system such as the wireless communication system 100.

In some embodiments, the wireless communication management module 515 may be an example of aspects of the wireless communication management module 215 described with reference to FIG. 2 and may include a PFP request transmission management module 525 and/or a PFP response analysis module 530. Each of these components may be in communication with each other.

In some examples, the PFP request transmission management module 525 may be used to transmit, to a WDC, a request regarding at least one PFP supported by the WDC. The request may be transmitted using a first P2P connection, and may be transmitted, for example, via the Wi-Fi transmitter 595 of the transmitter module 520. The WDC may be, for example, the WDC 105 described with reference to FIG. 1 or one of the apparatuses 205, 305, or 405 described with reference to FIG. 2, 3, or 4.

In some examples, the PFP response analysis module 530 may be used to receive a response message from the WDC (e.g., a response to the request transmitted using the PFP request transmission management module 525). The response message may indicate whether the WDC supports at least a WBE as a PFP, or a WDE as a PFP, or a combination thereof. The response message may be received, for example, via the Wi-Fi receiver 590 of the receiver module 510.

The response message received by the PFP response analysis module 530 may in some cases include a data type field. The data type field may include a value representing a PFP supported by the WDC. When the WDC supports the WBE as a PFP, the value of the data type field may indicate that the WDC supports the WBE as a PFP (e.g., the data type field may take the form of <peripheralFunction-ProtocolName>=wbe). When the WDC supports the WDE as a PFP, the value of the data type field may indicate that the WDC supports the WDE as a PFP (e.g., the data type field may take the form of <peripheralFunction-ProtocolName>=wde). In some cases, the response message received by the PFP response analysis module 530 may include more than one data type field, with respective values indicating that the WDC supports both the WBE and the WDE.

The response message received by the PFP response analysis module 530 may in some cases include a simple information element (IE; e.g., <pfpSimpleInfo>) or a detailed IE (e.g., <pfpDetailedInfo>). The simple IE may include a list of PFPs supported by the WDC. The detailed IE may further include additional information regarding a particular PFP supported by the WDC.

In some embodiments, the PFP request transmission management module 525 may be used to transmit (e.g., to a WDC) a request regarding PFPs supported by the WDC, and the PFP response analysis module 530 may then be used to receive a response message including a simple IE. The PFP request transmission management module 525 may be subsequently used to transmit (e.g., to the WDC) a request regarding a particular one of the PFPs (e.g., a particular PFP) supported by the WDC, and the PFP response analysis module 530 may then be used to receive a response message including a detailed IE.

Figure 6:
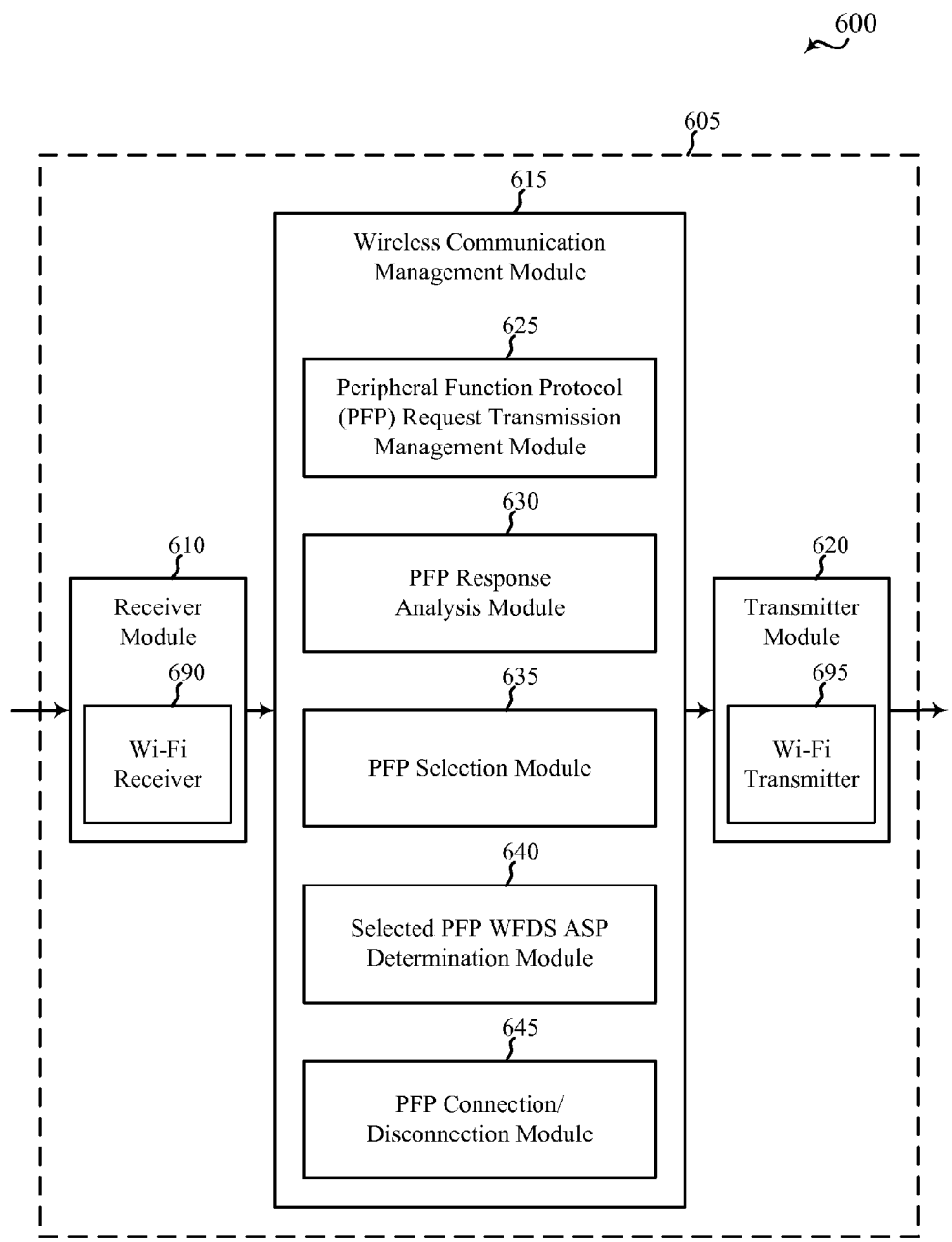
FIG. 6 shows a block diagram of an apparatus (e.g., a wireless dockee) for wireless communication, in accordance with various aspects of the present disclosure.

FIG. 6 shows a block diagram 600 of an apparatus 605 (e.g., a wireless dockee) for wireless communication, in accordance with various aspects of the present disclosure. In some embodiments, the apparatus 605 may be an example of aspects of the wireless device 115 described with reference to FIG. 1 and/or aspects of the apparatus 205 and/or 505 described with reference to FIGS. 2 and/or 5. The apparatus 605 may also be a processor. The apparatus 605 may include a receiver module 610, a wireless communication management module 615, and/or a transmitter module 620. Each of these components may be in communication with each other.

The components of the apparatus 605 may, individually or collectively, be implemented using at least one ASIC adapted to perform some or all of the applicable functions in hardware. Alternatively, the functions may be performed by other processing units (or cores), on integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by at least one general or application-specific processor.

In some embodiments, the receiver module 610 may be or include an RF receiver such as a Wi-Fi receiver 690. The receiver module 610 may also include other receivers, such as a WLAN receiver and/or WWAN receiver (e.g., a cellular receiver). The receiver module 610 may be used to receive various types of data and/or control signals (i.e., transmissions) over communication links (e.g., physical channels) of a wireless communication system such as the wireless communication system 100 described with reference to FIG. 1.

In some embodiments, the transmitter module 620 may be or include an RF transmitter such as a Wi-Fi transmitter 695. The transmitter module 620 may also include other transmitters, such as a WLAN transmitter and/or WWAN transmitter (e.g., a cellular transmitter). The transmitter module 620 may be used to transmit various types of data and/or control signals (i.e., transmissions) over communication links (e.g., physical channels) of a wireless communication system such as the wireless communication system 100.

In some embodiments, the wireless communication management module 615 may be an example of aspects of the wireless communication management module 215 and/or 515 described with reference to FIG. 2 and/or FIG. 5 and may include a PFP request transmission management module 625, a PFP response analysis module 630, a PFP selection module 635, a PFP WFDS ASP determination module 640, and/or a PFP connection/disconnection module 645. Each of these components may be in communication with each other.

In some examples, the PFP request transmission management module 625 may be used to transmit, to a WDC, a request regarding at least one PFP supported by the WDC. The request may be transmitted using a first P2P connection, and may be transmitted, for example, via the Wi-Fi transmitter 695 of the transmitter module 620. The WDC may be, for example, the WDC 105 described with reference to FIG. 1 or one of the apparatuses 205, 305, or 405 described with reference to FIG. 2, 3, or 4.

In some examples, the PFP response analysis module 530 may be used to receive a response message from the WDC (e.g., a response to the request transmitted using the PFP request transmission management module 625). The response message may indicate whether the WDC supports at least a WBE as a PFP, or a WDE as a PFP, or a combination thereof. The response message may be received, for example, via the Wi-Fi receiver 690 of the receiver module 610.

The response message received by the PFP response analysis module 630 may in some cases include a data type field. The data type field may include a value representing a PFP supported by the WDC. When the WDC supports the WBE as a PFP, the value of the data type field may indicate that the WDC supports the WBE as a PFP (e.g., the data type field may take the form of <peripheralFunction-ProtocolName>=wbe). When the WDC supports the WDE as a PFP, the value of the data type field may indicate that the WDC supports the WDE as a PFP (e.g., the data type field may take the form of <peripheralFunctionProtocolName>=wde). In some cases, the response message received by the PFP response analysis module 630 may include more than one data type field, with respective values indicating that the WDC supports both the WBE and the WDE.

The response message received by the PFP response analysis module 630 may in some cases include a IE (e.g., <pfpSimpleInfo>) or a detailed IE (e.g., <pfpDetailedInfo>). The simple IE may include a list of PFPs supported by the WDC. The detailed IE may further include additional information regarding a particular PFP supported by the WDC.

In some embodiments, the PFP request transmission management module 625 may be used to transmit (e.g., to a WDC) a request regarding PFPs supported by the WDC, and the PFP response analysis module 530 may then be used to receive a response message including a simple IE. The PFP request transmission management module 625 may be subsequently used to transmit (e.g., to the WDC) a request regarding a particular one of the PFPs (e.g., a particular PFP) supported by the WDC, and the PFP response analysis module 630 may then be used to receive a response message including a detailed IE.

After receiving a response message in response to a request regarding PFPs supported by the WDC, the PFP selection module 635 may select a particular PFP supported by the WDC (e.g., a WBE or a WDE supported as a PFP by the WDC) based at least in part on the response message (e.g., based at least in part on a list of PFPs supported by the WDC, which list may be part of a simple IE included in the response message).

After selection of the particular PFP supported by the WDC, the PFP connection/disconnection module 645 may be used to connect to the particular PFP. In some cases, the PFP connection/disconnection module 645 may cause the PFP request transmission management module 625 to transmit, to the WDC, a request for more specific information regarding the particular PFP. An additional response message may then be received from the WDC and analyzed by the PFP response analysis module 630. The additional response message may include a detailed IE, which detailed IE may include additional information regarding the particular PFP supported by the WDC. The additional information may be used to connect to the particular PFP supported by the WDC.

The detailed IE may include a network role IE (e.g., <networkRole>) and/or other information regarding the particular PFP supported by the WDC. The PFP connection/disconnection module 645 may identify a value of the network role IE. The value may indicate a network role to be assumed by the WDC for a first P2P connection over which the requests transmitted using the PFP request transmission management module 625 and the response messages received using the PFP response analysis module 630 may have been sent or received.

The PFP response analysis module 630 may compare a value of the network role IE to a value of a current network role assumed by the apparatus 605. When the comparison reveals that the value of the network role IE is different than the value of the current network role assumed by the apparatus 605, the PFP connection/disconnection module 645 may use the first P2P connection to connect to the particular PFP supported by the WDC. However, when the comparison reveals that the value of the network role IE matches the value of the current network role assumed by the apparatus 605, the PFP connection/disconnection module 645 may disconnect the apparatus 605 from the first P2P connection and establish a second P2P connection to connect to the particular PFP supported by the WDC.

In some examples of the wireless communication management module 615, the PFP WFDS ASP determination module 640 may be used to determine whether the particular PFP supported by the WDC is deployed over a WFDS ASP. When the particular PFP supported by the WDC is not deployed over a WFDS ASP, and when the value of the network role IE is different than the value of the current network role assumed by the apparatus 605, the PFP connection/disconnection module 645 may use the first P2P connection to connect to the particular PFP supported by the WDC. When the particular PFP supported by the WDC is deployed over a WFDS ASP, and when the value of the network role IE is different than the value of the current network role assumed by the apparatus 605, the PFP connection/disconnection module 645 may send an ASP session request coordination message (e.g., REQUEST_SESSION ASP coordination message) to the WDC over the first P2P connection. The ASP session request coordination message may be directed to the particular PFP supported by the WDC, for the purpose of connecting to the particular PFP supported by the WDC.

When the particular PFP supported by the WDC is not deployed over a WFDS ASP, and when the value of the network role IE matches the value of the current network role assumed by the apparatus 605, the PFP connection/disconnection module 645 may negotiate a new network role with the WDC and use the new network role and a second P2P connection to connect to the particular PFP. When the particular PFP supported by the WDC is deployed over a WFDS ASP, and when the value of the network role IE matches the value of the current network role assumed by the apparatus 605, the PFP connection/disconnection module 645 may initiate a new Provision Discovery request. The new Provision Discovery request may have a Connection Capability set to a new network role (e.g., 'CH' (0×02) or 'GO' (0×03)), which new network role may be different than the current network role assumed by the apparatus 605. The PFP connection/disconnection module 645 may further initiate a new ASP session over a second P2P connection, and the new network role and the second P2P connection may be used to connect to the particular PFP.

Figure 7:
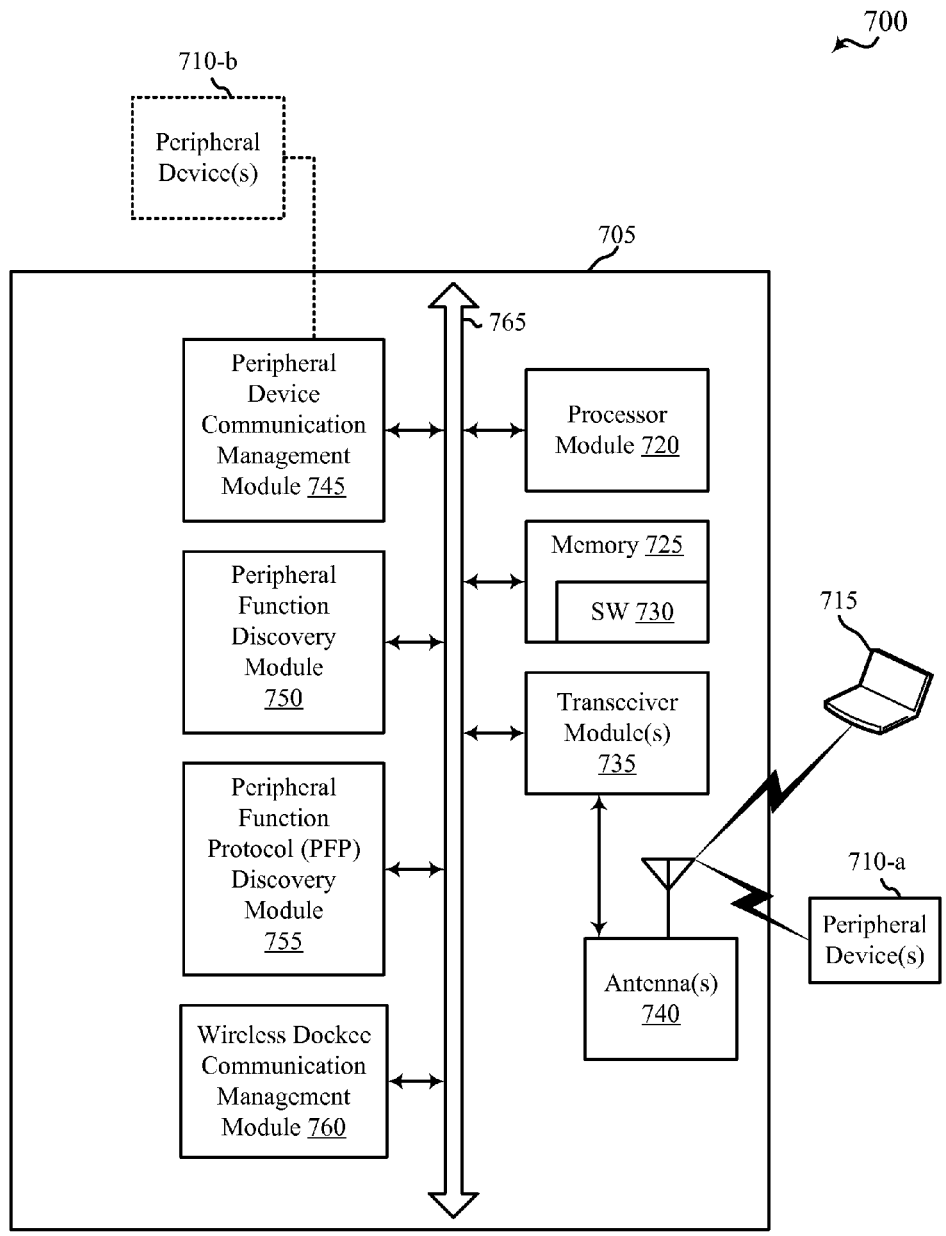
FIG. 7 shows a block diagram of a wireless communication system, in accordance with various aspects of the present disclosure.

FIG. 7 shows a block diagram of a wireless communication system 700, in accordance with various aspects of the present disclosure. The wireless communication system 700 may include a WDC 705, at least one peripheral device 710-a and 710-b, and wireless devices 715. The peripheral devices 710 may be external to or embedded in the WDC 705, and may communicate with the WDC 705 using wireless communication (e.g., in the case of peripheral device(s) 710-a) and/or wireline communication (e.g., in the case of peripheral device(s) 710-b). The WDC 705 may be an example of aspects of the WDC 105 described with reference to FIG. 1 and/or aspects of the apparatuses 205, 305, and/or 405 described with reference to FIGS. 2, 3, and/or 4. The WDC 705 may include a processor module 720, a memory module 725 (including software code 730), transceivers (represented by transceiver module(s) 735), antennas (represented by antenna(s) 740), a peripheral device communication management module 745, a peripheral function discovery module 750, a PFP discovery module 755, and/or a wireless dockee communication management module 760. Each of these components may be in communication with each other, directly or indirectly, over buses 765. Each of the wireless device(s) 715 may be an example of aspects of the wireless device 115 described with reference to FIG. 1 and/or aspects of the apparatuses 205, 505, and/or 605 described with reference to FIGS. 2, 5, and/or 6. The peripheral device(s) 710-a and/or 710-b may be examples of aspects of the peripheral devices 110 described with reference to FIG. 1.

The transceiver module(s) 735, in conjunction with antenna(s) 740, may facilitate wireless communication with wireless devices 715 and/or peripheral devices 710-a. Wireless communication with the wireless device(s) 715 may be managed using the wireless dockee communication management module 760. Wireless communication with the peripheral device(s) 710-*a* may be managed using the peripheral device communication management module 745. The peripheral device communication management module 745 may also manage wireline communication with at least one peripheral device 710-*b*.

The processor module 720 may include an intelligent hardware device, e.g., a central processing unit (CPU), a microcontroller, an ASIC, etc. The processor module 720 may process information received through the transceiver module(s) 735 and/or process information to be sent to the transceiver module(s) 735 for transmission through the antenna(s) 740. The processor module 720 may handle, alone or in connection with the wireless dockee communication management module 760 and/or the peripheral device communication management module 745, various aspects of communicating over a wireless and/or wireline communication system.

The memory module 725 may include random access memory (RAM) and/or read-only memory (ROM). The memory module 735 may store computer-readable, computer-executable software (SW) code 730 containing instructions to, when executed, cause the processor module 720 to perform various functions described herein for communicating over a wireless communication system. Alternatively, the software code 730 may not be directly executable by the processor module 720 but may cause the WDC 705 (e.g., when compiled and executed) to perform various of the functions described herein.

The peripheral function discovery module 750 may be used to discover at least one peripheral function (e.g., printing, viewing, storing, etc.) offered by the peripheral device(s) 710-*a* and/or 710-*b*. The PFP discovery module 755 may be used to discover at least one PFP supported by the WDC 705. The PFPs may include, for example, Miracast PFP, Wi-Fi USB PFP, WBE as a PFP, and/or WDE as a PFP. At least one of the PFPs may be used by wireless devices 715 to access at least one of the peripheral functions offered by the peripheral device(s) 710-*a* and/or 710-*b*.

The wireless dockee communication management module 760 may be an example of aspects of the wireless communication management module 215, 315, and/or 415 described with reference to FIGS. 2, 3, and/or 4. The wireless dockee communication management module 760 may be used to manage the wireless connection(s) of wireless devices 715 to at least one PFP supported by the WDC and, ultimately, to at least one peripheral function offered by at least one of the peripheral device(s) 710-*a* and/or 710-*b*.

In some embodiments, at least one of the peripheral device communication management module 745, the peripheral function discovery module 750, the PFP discovery module 755, and/or the wireless dockee communication management module 760, or portions of same, may include a processor, and/or some or all of the functionality of at least one of the peripheral device communication management module 745, the peripheral function discovery module 750, the PFP discovery module 755, and/or the wireless dockee communication management module 760 may be performed by the processor module 720 and/or in connection with the processor module 720.

Figure 8:
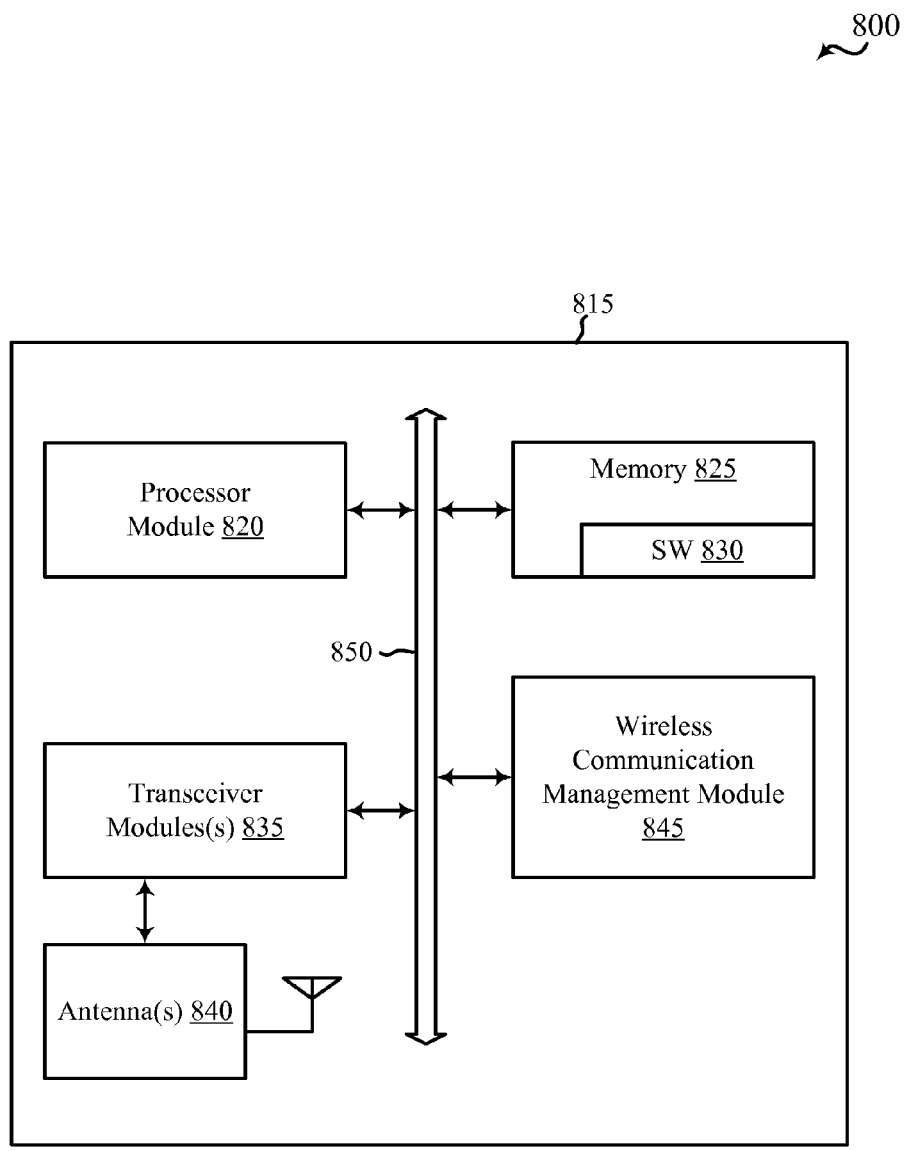
FIG. 8 shows a block diagram of a wireless device (e.g., a mobile device) configured for wireless communication, in accordance with various aspects of the present disclosure.

FIG. 8 shows a block diagram 800 of a wireless device 815 (e.g., a mobile device) configured for wireless communication, in accordance with various aspects of the present disclosure. The wireless device 815 may have various configurations and may be or be part of a computer (e.g., a laptop computer, netbook computer, tablet computer, etc.), a cellular telephone, a personal digital assistant (PDA), a digital video recorder (DVR), an internet appliance, a gaming console, an e-reader, etc. The wireless device 815 may in some cases have an internal power supply (not shown), such as a small battery, to facilitate mobile operation. In some embodiments, the wireless device 815 may be an example of aspects of the wireless device 115 and/or 715 described with reference to FIGS. 1 and/or 7, and/or aspects of one of the apparatuses 205, 505, and/or 605 described with reference to FIGS. 2, 5, and/or 6. The wireless device 815 may implement at least some of the features and functions described with reference to FIGS. 1, 2, 5, 6, and/or 7. The wireless device 815 may communicate with at least one WDC or apparatuses such as the WDC 105 and/or 705 described with reference to FIGS. 1 and/or 7, and/or the apparatus 205, 305, and/or 405 described with reference to FIGS. 2, 3, and/or 4.

The wireless device 815 may include a processor module 820, a memory module 825 (including software code 830), transceivers (represented by transceiver module(s) 835), antennas (represented by antenna(s) 840), and/or a wireless communication management module 845. Each of these components may be in communication with each other, directly or indirectly, over buses 850.

The transceiver module(s) 835, in conjunction with antenna(s) 840, may facilitate wireless communication with at least one WDC and/or other apparatuses. Wireless communication with a WDC may be managed using the wireless communication management module 845.

The processor module 820 may include an intelligent hardware device, e.g., a central processing unit (CPU), a microcontroller, an ASIC, etc. The processor module 820 may process information received through the transceiver module(s) 835 and/or process information to be sent to the transceiver module(s) 835 for transmission through the antenna(s) 840. The processor module 820 may handle, alone or in connection with the wireless communication management module 845, various aspects of communicating over a wireless and/or wireline communication system.

The memory module 835 may include RAM and/or ROM. The memory module 835 may store computer-readable, computer-executable software (SW) code 830 containing instructions to, when executed, cause the processor module 820 to perform various functions described herein for communicating over a wireless communication system. Alternatively, the software code 830 may not be directly executable by the processor module 820 but may cause the wireless device 815 (e.g., when compiled and executed) to perform various of the functions described herein.

The wireless communication management module 845 may be an example of aspects of the wireless communication management module 215, 515, and/or 615 described with reference to FIGS. 2, 5, and/or 6. The wireless communication management module 845 may be used to manage the wireless connection(s) of the wireless device 815 to at least one PFP supported by at least one WDC and, ultimately, to a peripheral function offered by at least one peripheral device(s) accessible via the PFPs.

In some embodiments, the wireless communication management module 845, or portions of same, may include a processor, and/or some or all of the functionality of the wireless communication management module 845 may be performed by the processor module 820 and/or in connection with the processor module 820.

Figure 9A:
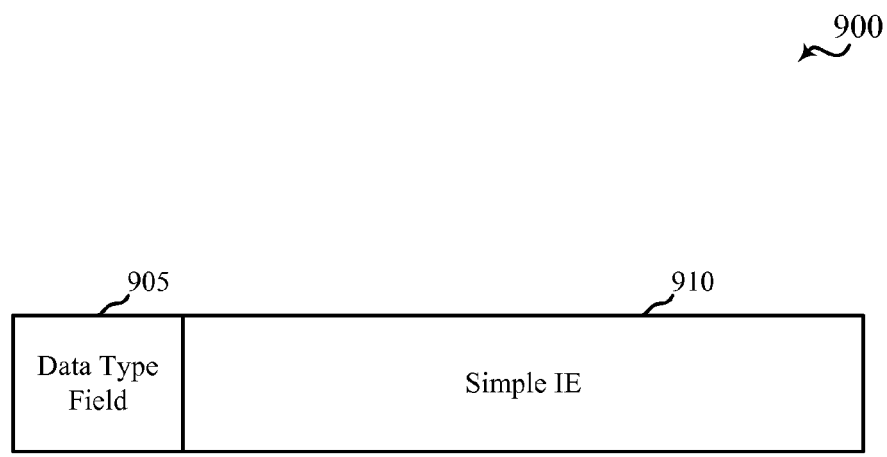
FIG. 9A shows a block diagram of an example of a response message, which response message may be transmitted by a WDC to a wireless device that transmitted, to the WDC, a request regarding one or more PFPs supported by the WDC, in accordance with various aspects of the present disclosure.

FIG. 9A shows a block diagram of an example of a response message 900, which response message 900 may be transmitted by a WDC to a wireless device that transmitted, to the WDC, a request regarding at least one PFP supported by the WDC, in accordance with various aspects of the present disclosure. The WDC may be an example of aspects of one of the WDCs 105 or 705 described with reference to FIG. 1 or 7, or aspects of one of the apparatuses 205, 305, or 405 described with reference to FIG. 2, 3, or 4. The wireless device may be an example of aspects of one of the wireless devices 115 or 815 described with reference to FIG. 1 or 8, and/or aspects of one of the apparatuses 205, 505, or 605 described with reference to FIG. 2, 5, or 6.

By way of example, the response message 900 may include a data type field 905 and a simple IE 910 (e.g., <pfpSimpleInfo>). The simple IE 910 may include a list of PFPs supported by the WDC.

The response message 900 may in some cases be transmitted to a wireless device, by a WDC, in response to the WDC receiving a request regarding PFPs supported by the WDC.

Figure 9B:
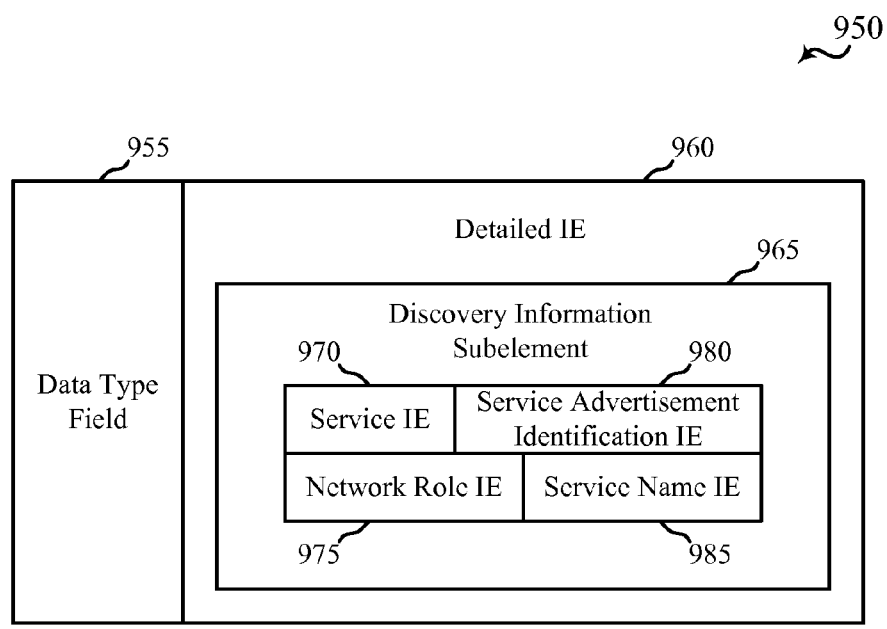
FIG. 9B shows a block diagram of an example of a response message, which response message may be transmitted by a WDC to a wireless device that transmitted, to the WDC, a request regarding one or more PFPs supported by the WDC, in accordance with various aspects of the present disclosure.

FIG. 9B shows a block diagram of an example of a response message 950, which response message 950 may be transmitted by a WDC to a wireless device that transmitted, to the WDC, a request regarding at least one PFP supported by the WDC, in accordance with various aspects of the present disclosure. The WDC may be an example of aspects of one of the WDCs 105 or 705 described with reference to FIG. 1 or 7, or aspects of one of the apparatuses 205, 305, or 405 described with reference to FIG. 2, 3, or 4. The wireless device may be an example of aspects of one of the wireless devices 115 or 815 described with reference to FIG. 1 or 8, and/or aspects of one of the apparatuses 205, 505, or 605 described with reference to FIG. 2, 5, or 6.

By way of example, the response message 950 may include a data type field 955 and a detailed IE field 960 (e.g., <pfpDetailedInfo>). The detailed IE 960 may include a discovery information subelement 965 (e.g., <discoveryInfo>). The discovery information subelement 965 may include a service IE 970 (e.g., <serviceInfo>), a network role IE 975 (e.g., <networkRole>), a service advertisement identification IE 980 (e.g., <advertisementId>), and/or a service name IE 985 (e.g., <serviceName>). The IEs of the discovery information subelement may be populated, for example, as described with reference to FIGS. 4 and/or 12.

The response message 950 may in some cases be transmitted to a wireless device, by a WDC, in response to the WDC receiving a request regarding a particular PFP supported by the WDC.

Figure 10:
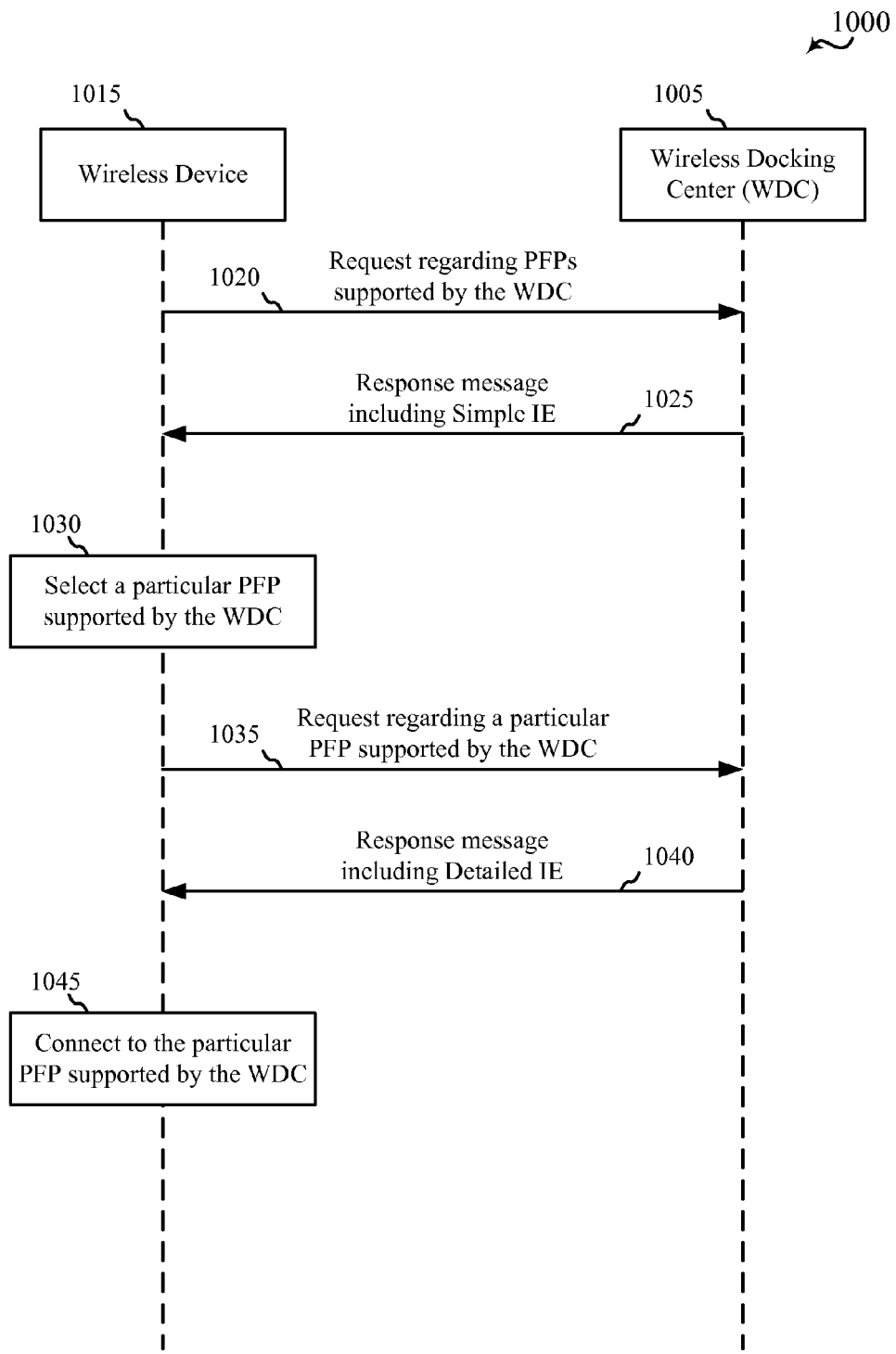
FIG. 10 is a message flow diagram showing wireless communication between a WDC and a wireless device for the purpose of connecting the wireless device to a particular PFP supported by the WDC, in accordance with various aspects of the present disclosure.

FIG. 10 is a message flow diagram 1000 showing wireless communication between a WDC 1005 and a wireless device 1015 for the purpose of connecting the wireless device 1015 to a particular PFP supported by the WDC 1005, in accordance with various aspects of the present disclosure. The WDC 1005 may be an example of aspects of the WDC 105 and/or 705 described with reference to FIGS. 1 and/or 7, and/or aspects of the apparatus 205, 305, and/or 405 described with reference to FIGS. 2, 3, and/or 4. The wireless device(s) 1015 may be an example of aspects of the wireless device 115, 715, and/or 815 described with reference to FIGS. 1, 7, and/or 8, and/or aspects of the apparatus 205, 505, and/or 605 described with reference to FIGS. 2, 5, and/or 6.

By way of example, the message flow may commence with the wireless device 1015 transmitting a request 1020 to the WDC 1005. The request 1020 may be a request regarding at least one PFP supported by the WDC 1005.

In response to receiving the request 1020, the WDC 1005 may transmit, to the wireless device 1015, a response message 1025 indicating whether the WDC 1005 supports at least a WBE as a PFP, or a WDE as a PFP, or a combination thereof. The response message 1025 may in some cases have the format described with reference to FIG. 9A and may include a simple IE (e.g., <pfpSimpleInfo>). The simple IE may include a list of PFPs supported by the WDC 1005.

At block 1030, the wireless device 1015 may select a particular PFP supported by the WDC 1005 based at least in part on the response message. The wireless device 1015 may then transmit, to the WDC 1005, a request 1035 for more specific information regarding the particular PFP supported by the WDC 1005.

In response to receiving the request 1035, the WDC 1005 may transmit, to the wireless device 1015, an additional response message 1040. The additional response message 1040 may include a detailed IE (e.g., <pfpDetailedInfo>), which detailed IE may include additional information regarding the particular PFP supported by the WDC 1005. The additional information may be used to connect to the particular PFP supported by the WDC 1005 at block 1045.

Figure 11:
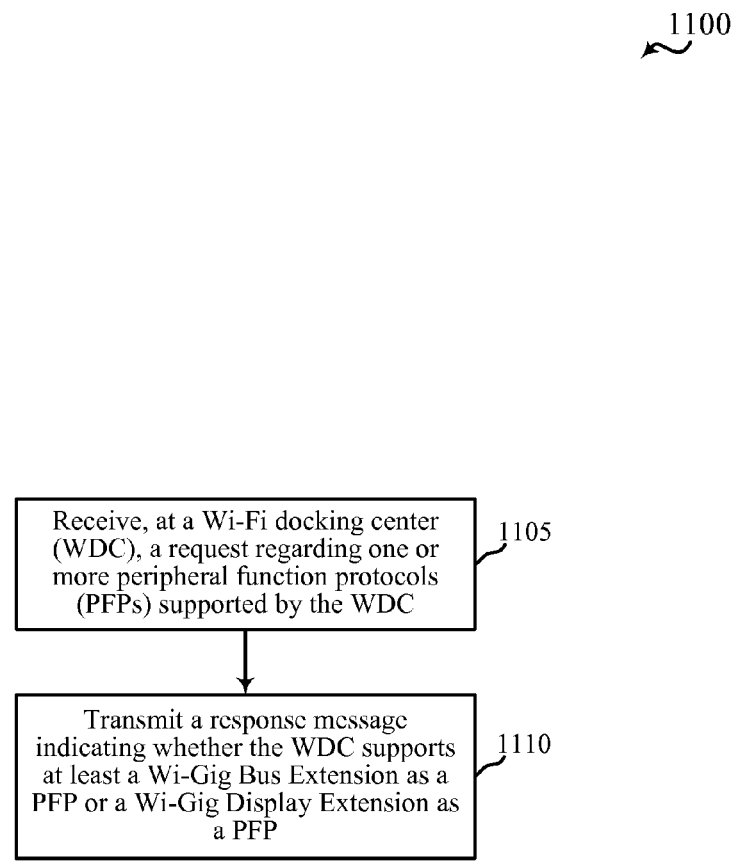
FIG. 11 is a flow chart illustrating an example of a method for wireless communication (e.g., by a WDC), in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of at least one of the WDC 105 and/or 705 described with reference to FIGS. 1 and/or 7, and/or aspects of at least one of the apparatuses 205, 305, and/or 405 described with reference to FIGS. 2, 3, and/or 4. In some examples, a WDC such as the WDC 105 or 705, or an apparatus such as one of the apparatuses 205, 305, or 405, may execute at least one set of codes to control the functional elements of the WDC or apparatus to perform the functions described below.

At block 1105, a request may be received at a WDC. The request may be a request regarding at least one PFP supported by the WDC. The operation(s) at block 1105 may be performed by the wireless communication management module 215, 315, and/or 415 described with reference to FIGS. 2, 3, and/or 4, the wireless dockee communication management module 760 described with reference to FIG. 7, and/or the PFP request analysis module 325 and/or 425 described with reference to FIGS. 3 and/or 4.

At block 1110, a response message indicating whether the WDC supports at least a WBE as a PFP or a WDE as a PFP (e.g., a response to the request received at block 1105) may be transmitted. The operation(s) at block 1110 may be performed by the wireless communication management module 215, 315, and/or 415 described with reference to FIGS. 2, 3, and/or 4, the wireless dockee communication management module 760 described with reference to FIG. 7, and/or the PFP response transmission management module 330 and/or 430 described with reference to FIGS. 3 and/or 4.

The response message transmitted at block 1110 may in some cases include a data type field. The data type field may include a value representing a PFP supported by the WDC. When the WDC supports the WBE as a PFP, the value of the data type field may indicate that the WDC supports the WBE as a PFP (e.g., the data type field may take the form of <peripheralFunctionProtocolName>=wbe). When the WDC supports the WDE as a PFP, the value of the data type field may indicate that the WDC supports the WDE as a PFP (e.g., the data type field may take the form of <peripheralFunctionProtocolName>=wde). In some cases, the response message transmitted at block 1110 may include more than one data type field, with respective values indicating that the WDC supports both the WBE and the WDE.

The response message transmitted at block 1110 may in some cases include a simple IE (e.g., <pfpSimpleInfo>) or a detailed IE (e.g., <pfpDetailedInfo>). The simple IE may include a list of PFPs supported by the WDC. The detailed IE may further include additional information regarding a particular PFP supported by the WDC.

In some embodiments, the method 1100 may be performed a first time in response to receiving (e.g., from a wireless device) a request regarding PFPs supported by the WDC, and a second time in response to receiving (e.g., from the wireless device) a request regarding a particular one of the PFPs (e.g., a particular PFP) supported by the WDC. A response message including a simple IE may be transmitted (e.g., to the wireless device) in response to the request regarding PFPs supported by the WDC, and a response message including a detailed IE may be transmitted (e.g., to the wireless device) in response to the request regarding the particular PFP supported by the WDC. The PFP request type (e.g., a request regarding PFPs supported by the WDC, or a request regarding a particular PFP) may be determined, for example, by the wireless communication management module 215, 315, and/or 415 described with reference to FIGS. 2, 3, and/or 4, the wireless dockee communication management module 760 described with reference to FIG. 7, the PFP request analysis module 325 and/or 425 described with reference to FIGS. 3 and/or 4, and/or the PFP request type determination module 435 described with reference to FIG. 4. The simple IE may in some cases be formatted using the simple IE formatting module 440 described with reference to FIG. 4. The detailed IE may in some cases be formatted using the detailed IE formatting module 445 described with reference to FIG. 4.

Thus, the method 1100 may provide for wireless communication. It should be noted that the method 1100 is just one implementation and that the operations of the method 1100 may be rearranged or otherwise modified such that other implementations are possible.

Figure 12:
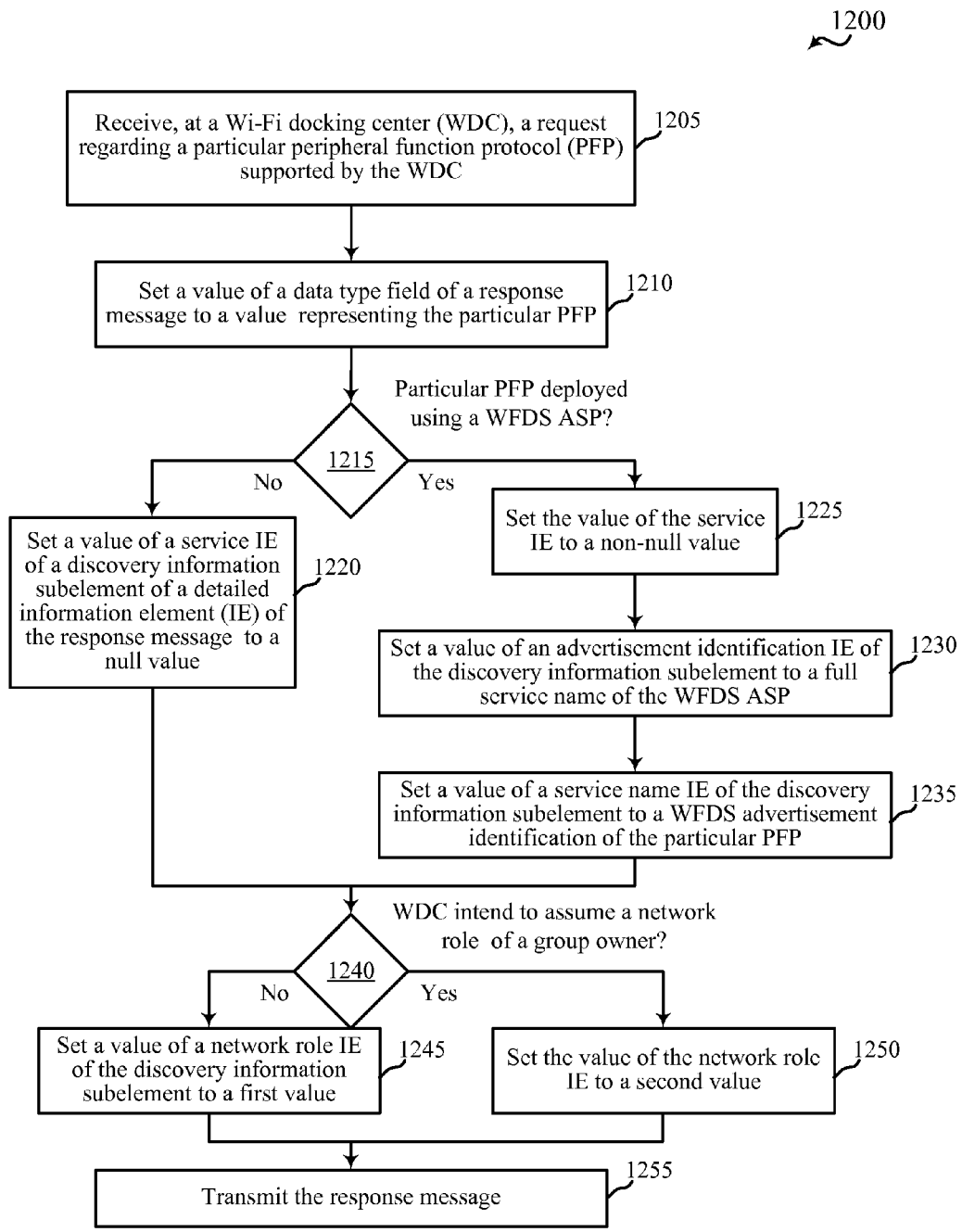
FIG. 12 is a flow chart illustrating an example of a method for wireless communication (e.g., by a WDC), in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of at least one of the WDC 105 and/or 705 described with reference to FIGS. 1 and/or 7, and/or aspects of at least one of the apparatuses 205, 305, and/or 405 described with reference to FIGS. 2, 3, and/or 4. In some examples, a WDC such as the WDC 105 or 705, or an apparatus such as one of the apparatuses 205, 305, or 405, may execute at least one set of codes to control the functional elements of the WDC or apparatus to perform the functions described below.

At block 1205, a request may be received at a WDC. The request may be a request regarding a particular PFP supported by the WDC (e.g., a WBE or a WDE supported as a PFP by the WDC). The operation(s) at block 1205 may be performed by the wireless communication management module 215, 315, and/or 415 described with reference to FIGS. 2, 3, and/or 4, the wireless dockee communication management module 760 described with reference to FIG. 7, and/or the PFP request analysis module 325 and/or 425 described with reference to FIGS. 3 and/or 4.

At blocks 1210, 1215, 1220, 1225, 1230, 1235, 1240, 1245, and/or 1250, a response message (e.g., a response to the request received at block 1205) may be prepared. The response message may include a data type field which, at block 1210, may be set to a value representing the particular PFP. When the particular PFP is a WBE, the value of the data type field may indicate that the WDC supports the WBE as a PFP (e.g., the data type field may take the form of <peripheralFunctionProtocolName>=wbe). When the particular PFP is a WDE, the value of the data type field may indicate that the WDC supports the WDE as a PFP (e.g., the data type field may take the form of <peripheralFunctionProtocolName>=wde).

At block 1215, it may be determined whether the particular PFP is deployed using a WFDS ASP. The operation(s) at block 1215 may be performed by the wireless communication management module 215, 315, and/or 415 described with reference to FIGS. 2, 3, and/or 4, the wireless dockee communication management module 760 described with reference to FIG. 7, the PFP response transmission management module 330 and/or 430 described with reference to FIGS. 3 and/or 4, and/or the PFP WFDS ASP deployment determination module 450 described with reference to FIG. 4.

When it is determined at block 1215 that the particular PFP is not deployed using the WFDS ASP, a value of a service IE (e.g., <serviceInfo>) of a discovery information subelement (e.g., <disoveryInfo>) of a detailed IE (e.g., <pfpDetailedInfo>) of the response message may be set to a null value at block 1220. When it is determined at block 1215 that the particular PFP is deployed using the WFDS ASP, the value of the service IE may be set to a non-null value at block 1225. The non-null value may be the same value as a service information attribute of the WFDS ASP (e.g., the same value as the <service information> attribute of the WFDS AdvertiseService for the particular PFP).

At block 1230, and when it is determined that the particular PFP is deployed using the WFDS ASP, the value of an advertisement identification IE of the discovery information subelement may be set to a WFDS advertisement identification of the particular PFP; and at block 1235, the value of a service name IE of the discover information subelement may be set to a full service name of the WFDS ASP.

At block 1240, it may be determined whether the WDC intends to assume a network role of a group owner of a P2P session providing the particular PFP. When the WDC intends to assume the network role of the group owner, a value of a network role IE (e.g., <networkRole>) of the discovery information subelement may be set to a first value (e.g., a value corresponding to a network role of a group owner) at block 1245. Otherwise, the value of the network role IE may be set to a second value (e.g., a value corresponding to a network role of a client) at block 1250.

The operation(s) at block 1210, 1220, 1225, 1230, 1235, 1240, 1245, and/or 1250 may be performed by the wireless communication management module 215, 315, and/or 415 described with reference to FIGS. 2, 3, and/or 4, the wireless dockee communication management module 760 described with reference to FIG. 7, the PFP response transmission management module 330 and/or 430 described with reference to FIGS. 3 and/or 4, and/or the detailed IE formatting module 445 described with reference to FIG. 4.

At block 1255, the response message may be transmitted (e.g., to the wireless device from which the request is received at block 1205). The operation(s) at block 1255 may be performed by the wireless communication management module 215, 315, and/or 415 described with reference to FIGS. 2, 3, and/or 4, the wireless dockee communication management module 760 described with reference to FIG. 7, the PFP response transmission management module 330 and/or 430 described with reference to FIGS. 3 and/or 4, the transmitter module 220, 320, and/or 420 described with reference to FIGS. 2, 3, and/or 4, and/or the transceiver module 735 described with reference to FIG. 7.

Thus, the method 1200 may provide for wireless communication. It should be noted that the method 1200 is just one implementation and that the operations of the method 1200 may be rearranged or otherwise modified such that other implementations are possible.

In some embodiments, aspects of the method 1100 described with reference to FIG. 11 and the method 1200 described with reference to FIG. 12 may be combined.

Figure 13:
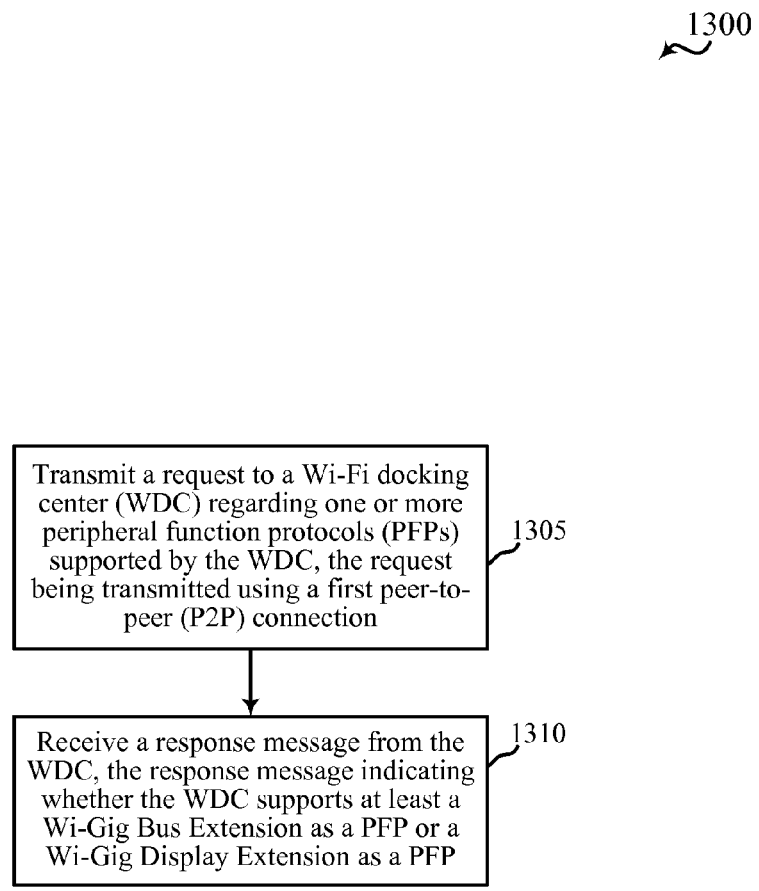
FIG. 13 is a flow chart illustrating an example of a method for wireless communication (e.g., by a wireless dockee), in accordance with various aspects of the present disclosure.

FIG. 13 is a flow chart illustrating an example of a method 1300 for wireless communication (e.g., by a wireless dockee), in accordance with various aspects of the present disclosure. For clarity, the method 1300 is described below with reference to aspects of at least one of the wireless devices 115 and/or 815 described with reference to FIGS. 1 and/or 8 (e.g., a mobile device), and/or aspects of at least one of the apparatuses 205, 505, and/or 605 described with reference to FIGS. 2, 5, and/or 6. In some examples, a wireless device such as the wireless device 115 or 815, or an apparatus such as one of the apparatuses 205, 505, or 605, may execute at least one set of codes to control the functional elements of the wireless device or apparatus to perform the functions described below.

At block 1305, a request may be transmitted to a WDC. The request may be a request regarding at least one PFP supported by the WDC. The request may be transmitted using a first P2P connection. The operation(s) at block 1305 may be performed by the wireless communication management module 215, 515, 615, and/or 815 described with reference to FIGS. 2, 5, 6, and/or 8, and/or the PFP request transmission management module 525 and/or 625 described with reference to FIGS. 5 and/or 6.

At block 1310, a response message indicating whether the WDC supports at least a WBE as a PFP or a WDE as a PFP (e.g., a response to the request transmitted at block 1305) may be received. The operation(s) at block 1310 may be performed by the wireless communication management module 215, 515, 615, and/or 815 described with reference to FIGS. 2, 5, 6, and/or 8, and/or the PFP response analysis module 530 and/or 630 described with reference to FIGS. 5 and/or 6.

The response message received at block 1310 may in some cases include a data type field. The data type field may include a value representing a PFP supported by the WDC. When the WDC supports the WBE as a PFP, the value of the data type field may indicate that the WDC supports the WBE as a PFP (e.g., the data type field may take the form of <peripheralFunctionProtocolName>=wbe). When the WDC supports the WDE as a PFP, the value of the data type field may indicate that the WDC supports the WDE as a PFP (e.g., the data type field may take the form of <peripheralFunctionProtocolName>=wde). In some cases, the response message transmitted at block 1310 may include more than one data type field, with respective values indicating that the WDC supports both the WBE and the WDE.

The response message received at block 1310 may in some cases include a simple IE (e.g., <pfpSimpleInfo>) or a detailed IE (e.g., <pfpDetailedInfo>). The simple IE may include a list of PFPs supported by the WDC. The detailed IE may further include additional information regarding a particular PFP supported by the WDC.

In some embodiments, the method 1300 may be performed a first time determine which PFPs are supported by the WDC, and a second time to request more specific information regarding a particular one of the PFPs (e.g., a particular PFP) supported by the WDC. A response message including a simple IE may be received from the WDC in response to a request regarding which PFPs are supported by the WDC, and a response message including a detailed IE may be received in response to a request regarding a particular PFP supported by the WDC.

Thus, the method 1300 may provide for wireless communication. It should be noted that the method 1300 is just one implementation and that the operations of the method 1300 may be rearranged or otherwise modified such that other implementations are possible.

Figure 14:
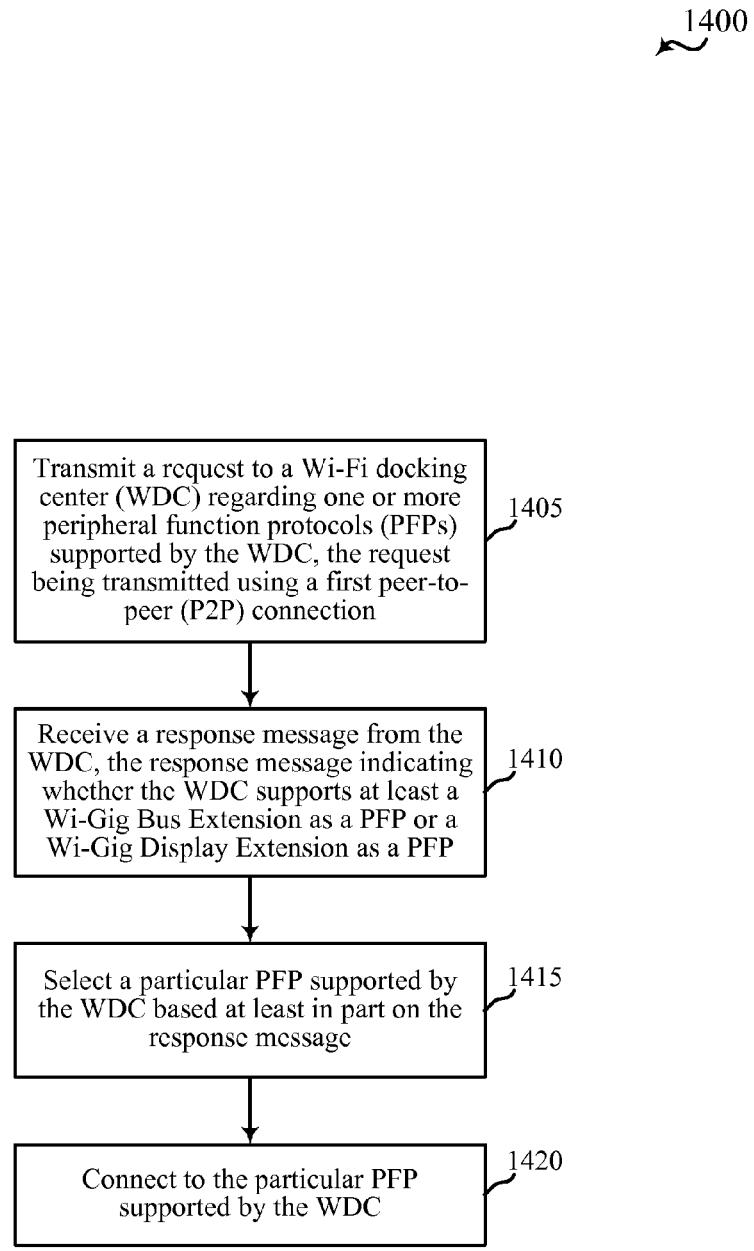
FIG. 14 is a flow chart illustrating an example of a method for wireless communication (e.g., by a wireless dockee), in accordance with various aspects of the present disclosure.

FIG. 14 is a flow chart illustrating an example of a method 1400 for wireless communication (e.g., by a wireless dockee), in accordance with various aspects of the present disclosure. For clarity, the method 1400 is described below with reference to aspects of at least one of the wireless devices 115 and/or 815 described with reference to FIGS. 1 and/or 8 (e.g., a mobile device), and/or aspects of at least one of the apparatuses 205, 505, and/or 605 described with reference to FIGS. 2, 5, and/or 6. In some examples, a wireless device such as the wireless device 115 or 815, or an apparatus such as one of the apparatuses 205, 505, or 605, may execute at least one set of codes to control the functional elements of the wireless device or apparatus to perform the functions described below.

At block 1405, a request may be transmitted to a WDC. The request may be a request regarding at least one PFP supported by the WDC. The request may be transmitted using a first P2P connection. The operation(s) at block 1405 may be performed by the wireless communication management module 215, 515, 615, and/or 815 described with reference to FIGS. 2, 5, 6, and/or 8, and/or the PFP request transmission management module 525 and/or 625 described with reference to FIGS. 5 and/or 6.

At block 1410, a response message indicating whether the WDC supports at least a WBE as a PFP or a WDE as a PFP (e.g., a response to the request transmitted at block 1305) may be received. The operation(s) at block 1410 may be performed by the wireless communication management module 215, 515, 615, and/or 815 described with reference to FIGS. 2, 5, 6, and/or 8, and/or the PFP response analysis module 530 and/or 630 described with reference to FIGS. 5 and/or 6.

The response message received at block 1410 may in some cases include a data type field. The data type field may include a value representing a PFP supported by the WDC. When the WDC supports the WBE as a PFP, the value of the data type field may indicate that the WDC supports the WBE as a PFP (e.g., the data type field may take the form of <peripheralFunctionProtocolName>=wbe). When the WDC supports the WDE as a PFP, the value of the data type field may indicate that the WDC supports the WDE as a PFP (e.g., the data type field may take the form of <peripheralFunctionProtocolName>=wde). In some cases, the response message transmitted at block 1310 may include more than one data type field, with respective values indicating that the WDC supports both the WBE and the WDE.

The response message received at block 1410 may in some cases include a simple IE (e.g., <pfpSimpleInfo>). The simple IE may include a list of PFPs supported by the WDC.

At block 1415, a particular PFP supported by the WDC may be selected based at least in part on the response message. The operation(s) at block 1415 may be performed by the wireless communication management module 215, 515, 615, and/or 815 described with reference to FIGS. 2, 5, 6, and/or 8, and/or the PFP selection module 635 described with reference to FIG. 6.

At block 1420, a connection to the particular PFP supported by the WDC may be made. Connecting to the particular PFP supported by the WDC may in some cases include transmitting, to the WDC, a request for more specific information regarding the particular PFP supported by the WDC. An additional response message may then be received from the WDC. The additional response message may include a detailed IE (e.g., <pfpDetailedInfo>), which detailed IE may include additional information regarding the particular PFP supported by the WDC. The additional information may be used to connect to the particular PFP supported by the WDC, as described, for example, with reference to FIGS. 15 and/or 16.

The operation(s) at block 1420 may be performed by the wireless communication management module 215, 515, 615, and/or 815 described with reference to FIGS. 2, 5, 6, and/or 8, and/or the PFP connection/disconnection module 645 described with reference to FIG. 6.

Thus, the method 1400 may provide for wireless communication. It should be noted that the method 1400 is just one implementation and that the operations of the method 1400 may be rearranged or otherwise modified such that other implementations are possible.

Figure 15:
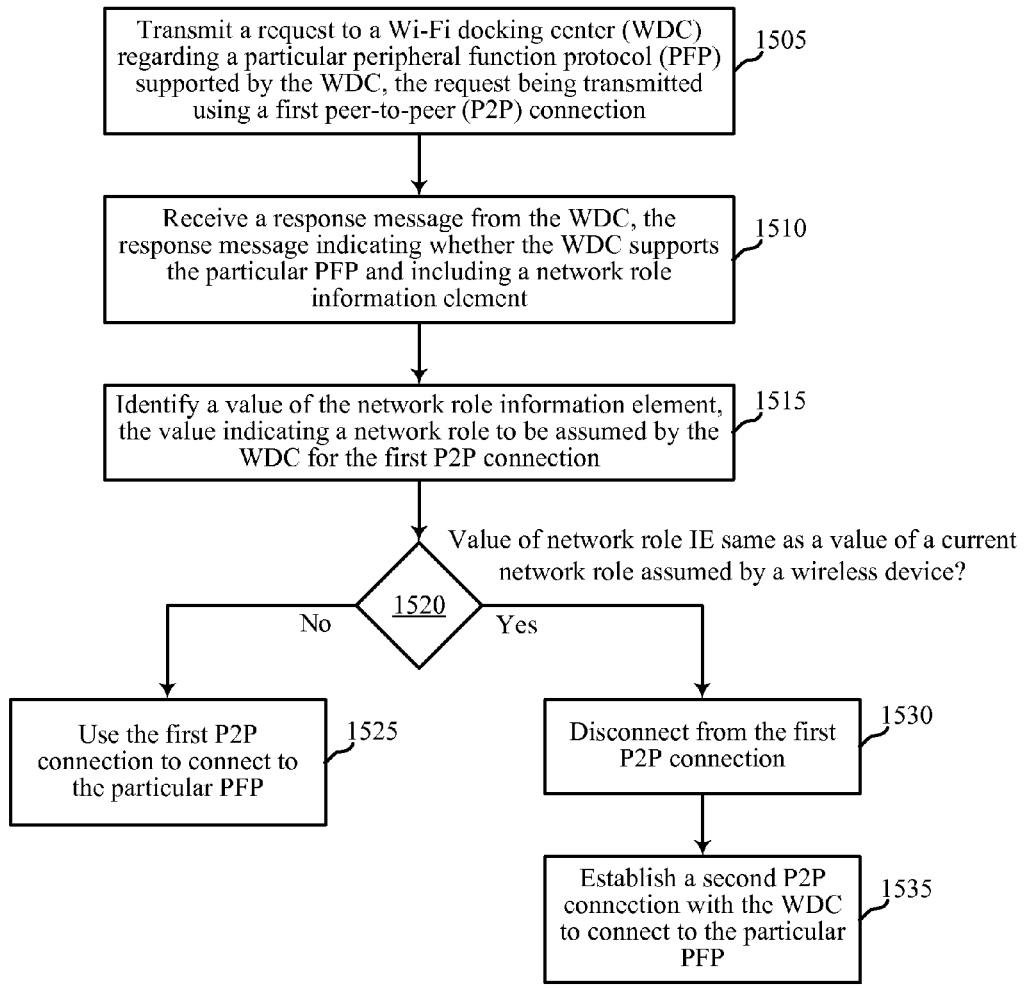
FIG. 15 is a flow chart illustrating an example of a method for wireless communication (e.g., by a wireless dockee), in accordance with various aspects of the present disclosure.

FIG. 15 is a flow chart illustrating an example of a method 1500 for wireless communication (e.g., by a wireless dockee), in accordance with various aspects of the present disclosure. For clarity, the method 1500 is described below with reference to aspects of at least one of the wireless devices 115 and/or 815 described with reference to FIGS. 1 and/or 8 (e.g., a mobile device), and/or aspects of at least one of the apparatuses 205, 505, and/or 605 described with reference to FIGS. 2, 5, and/or 6. In some examples, a wireless device such as the wireless device 115 or 815, or an apparatus such as one of the apparatuses 205, 505, or 605, may execute at least one set of codes to control the functional elements of the wireless device or apparatus to perform the functions described below.

At block 1505, a request may be transmitted to a WDC. The request may be a request regarding a particular PFP supported by the WDC (e.g., a WBE or a WDE supported as a PFP by the WDC). The request may be transmitted using a first P2P connection. The operation(s) at block 1505 may be performed by the wireless communication management module 215, 515, 615, and/or 815 described with reference to FIGS. 2, 5, 6, and/or 8, and/or the PFP request transmission management module 525 and/or 625 described with reference to FIGS. 5 and/or 6.

At block 1510, a response message indicating whether the WDC supports the particular PFP may be received from the WDC. The operation(s) at block 1510 may be performed by the wireless communication management module 215, 515, 615, and/or 815 described with reference to FIGS. 2, 5, 6, and/or 8, and/or the PFP response analysis module 530 and/or 630 described with reference to FIGS. 5 and/or 6.

The response message received at block 1510 may in some cases include a data type field. The data type field may include a value representing the particular PFP. When the particular PFP is a WBE, the value of the data type field may indicate that the WDC supports the WBE as a PFP (e.g., the data type field may take the form of <peripheralFunctionProtocolName>=wbe). When the particular PFP is a WDE, the value of the data type field may indicate that the WDC supports the WDE as a PFP (e.g., the data type field may take the form of <peripheralFunctionProtocolName>=wde).

The response message received at block 1510 may also include a network role IE (e.g., <networkRole>). The network role IE may in some cases be included with a detailed IE (e.g., <pfpDetailedInfo>). The detailed IE may also include other information regarding the particular PFP supported by the WDC.

At block 1515, a value of the network role IE may be identified. The value may indicate a network role to be assumed by the WDC for the first P2P connection. At block 1520, the value of the network role IE may be compared to a value of a current network role assumed by a wireless device (e.g., the wireless device performing the method 1500). The operation(s) at block 1515 and/or block 1520 may be performed by the wireless communication management module 215, 515, 615, and/or 815 described with reference to FIGS. 2, 5, 6, and/or 8, and/or the PFP response analysis module 530 and/or 630 described with reference to FIGS. 5 and/or 6.

At block 1525, and when the comparison made at block 1520 reveals that the value of the network role IE is different than the value of the current network role assumed by the wireless device, the first P2P connection may be used to connect to the particular PFP supported by the WDC.

When the comparison made at block 1520 reveals that the value of the network role IE matches the value of the current network role assumed by the wireless device, the wireless device may disconnect from the first P2P connection at block 1530 and establish a second P2P connection to connect to the particular PFP supported by the WDC at block 1535.

The operation(s) at block 1525, 1530, and/or block 1535 may be performed by the wireless communication management module 215, 515, 615, and/or 815 described with reference to FIGS. 2, 5, 6, and/or 8, and/or the PFP connection/disconnection module 645 described with reference to FIG. 6.

Thus, the method 1500 may provide for wireless communication. It should be noted that the method 1500 is just one implementation and that the operations of the method 1500 may be rearranged or otherwise modified such that other implementations are possible.

Figure 16:
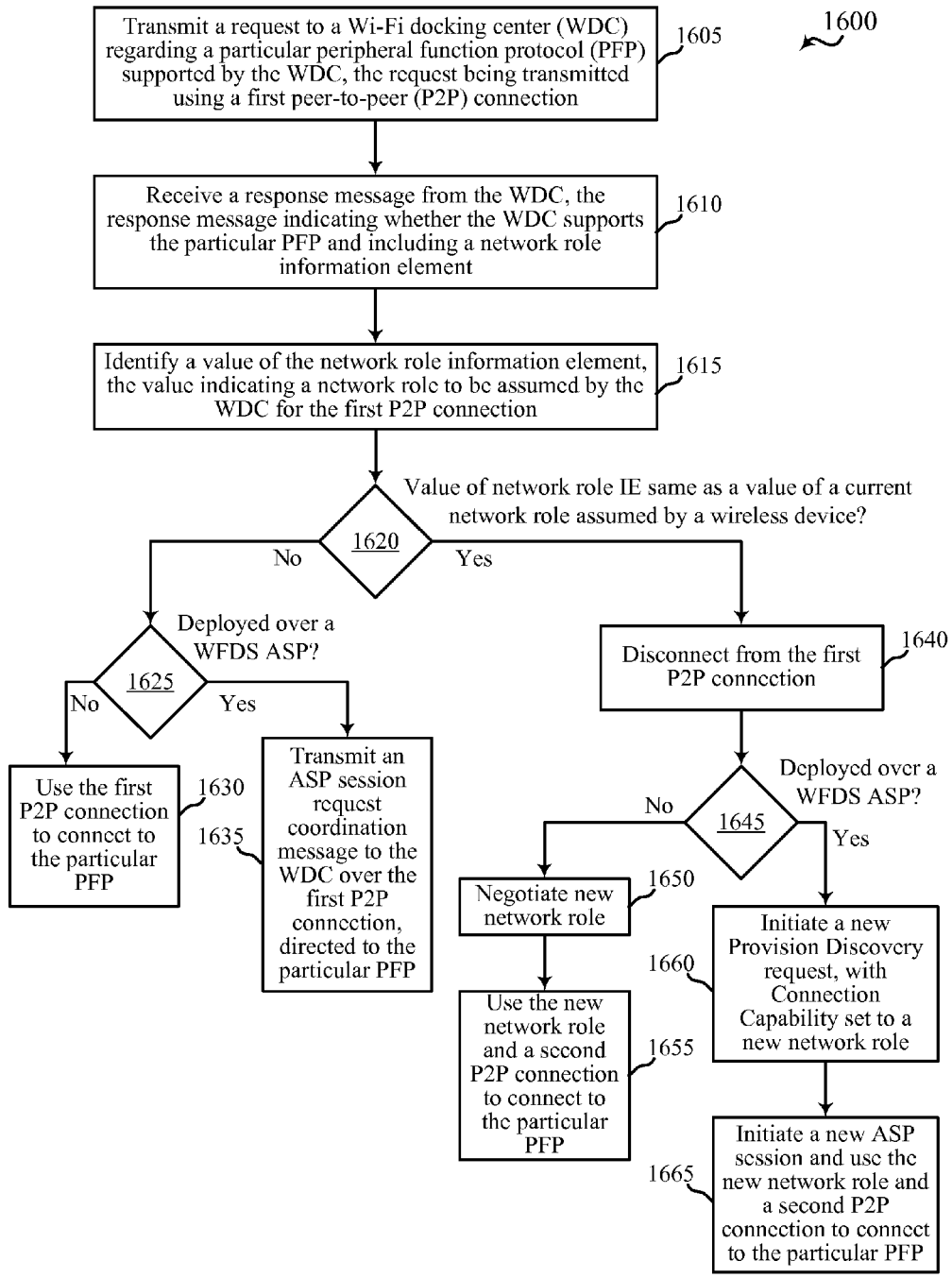
FIG. 16 is a flow chart illustrating an example of a method for wireless communication (e.g., by a wireless dockee), in accordance with various aspects of the present disclosure.

FIG. 16 is a flow chart illustrating an example of a method 1600 for wireless communication (e.g., by a wireless dockee), in accordance with various aspects of the present disclosure. For clarity, the method 1600 is described below with reference to aspects of at least one of the wireless devices 115 and/or 815 described with reference to FIGS. 1 and/or 8 (e.g., a mobile device), and/or aspects of at least one of the apparatuses 205, 505, and/or 605 described with reference to FIGS. 2, 5, and/or 6. In some examples, a wireless device such as the wireless device 115 or 815, or an apparatus such as one of the apparatuses 205, 505, or 605, may execute at least one set of codes to control the functional elements of the wireless device or apparatus to perform the functions described below.

At block 1605, a request may be transmitted to a WDC. The request may be a request regarding a particular PFP supported by the WDC (e.g., a WBE or a WDE supported as a PFP by the WDC). The request may be transmitted using a first P2P connection. The operation(s) at block 1605 may be performed by the wireless communication management module 215, 515, 615, and/or 815 described with reference to FIGS. 2, 5, 6, and/or 8, and/or the PFP request transmission management module 525 and/or 625 described with reference to FIGS. 5 and/or 6.

At block 1610, a response message indicating whether the WDC supports the particular PFP may be received from the WDC. The operation(s) at block 1610 may be performed by the wireless communication management module 215, 515, 615, and/or 815 described with reference to FIGS. 2, 5, 6, and/or 8, and/or the PFP response analysis module 530 and/or 630 described with reference to FIGS. 5 and/or 6.

The response message received at block 1610 may in some cases include a data type field. The data type field may include a value representing the particular PFP. When the particular PFP is a WBE, the value of the data type field may indicate that the WDC supports the WBE as a PFP (e.g., the data type field may take the form of <peripheralFunction-ProtocolName>=wbe). When the particular PFP is a WDE, the value of the data type field may indicate that the WDC supports the WDE as a PFP (e.g., the data type field may take the form of <peripheralFunctionProtocolName>=wde).

The response message received at block 1610 may also include a network role IE (e.g., <networkRole>). The network role IE may in some cases be included with a detailed IE (e.g., <pfpDetailedInfo>). The detailed IE may also include other information regarding the particular PFP supported by the WDC.

At block 1615, a value of the network role IE may be identified. The value may indicate a network role to be assumed by the WDC for the first P2P connection. At block 1620, the value of the network role IE may be compared to a value of a current network role assumed by a wireless device (e.g., the wireless device performing the method 1600). The operation(s) at block 1615 and/or block 1620 may be performed by the wireless communication management module 215, 515, 615, and/or 815 described with reference to FIGS. 2, 5, 6, and/or 8, and/or the PFP response analysis module 530 and/or 630 described with reference to FIGS. 5 and/or 6.

At block 1625, and when the comparison made at block 1620 reveals that the value of the network role IE is different than the value of the current network role assumed by the wireless device, it may be determined whether the particular PFP supported by the WDC is deployed over a WFDS ASP. When the particular PFP supported by the WDC is not deployed over a WFDS ASP, the first P2P connection may be used to connect to the particular PFP supported by the WDC at block 1630. When the particular PFP supported by the WDC is deployed over a WFDS ASP, an ASP session request coordination message (e.g., REQUEST_SESSION ASP coordination message) may be sent to the WDC over the first P2P connection at block 1635. The ASP session request coordination message may be directed to the particular PFP, for the purpose of connecting to the particular PFP supported by the WDC.

When the comparison made at block 1620 reveals that the value of the network role IE matches the current network role assumed by the wireless device, the wireless device may disconnect from the first P2P connection at block 1640. At block 1645, it may be determined whether the particular PFP supported by the WDC is deployed over a WFDS ASP. When the particular PFP supported by the WDC is not deployed over a WFDS ASP, the wireless device performing the method 1600 may negotiate a new network role with the WDC at block 1650, and at block 1655 use the new network role and a second P2P connection to connect to the particular PFP. When the particular PFP supported by the WDC is deployed over a WFDS ASP, a new Provision Discovery request may be initiated at block 1660. The new Provision Discovery request may have a Connection Capability set to a new network role (e.g., 'Cli' (0x02) or 'GO' (0x03)), which new network role may be different than the current network role assumed by the wireless device. At block 1665, a new ASP session may be initiated over a second P2P connection, and the new network role and the second P2P connection may be used to connect to the particular PFP.

The operation(s) at block 1625 and/or block 1645 may be performed by the wireless communication management module 215, 515, 615, and/or 815 described with reference to FIGS. 2, 5, 6, and/or 8, and/or the PFP WFDS ASP determination module 640 described with reference to FIG. 6.

The operation(s) at block 1630, 1635, 1640, 1650, 1655, 1660, and/or 1665 may be performed by the wireless communication management module 215, 515, 615, and/or 815 described with reference to FIGS. 2, 5, 6, and/or 8, and/or the PFP connection/disconnection module 645 described with reference to FIG. 6.

Thus, the method 1600 may provide for wireless communication. It should be noted that the method 1600 is just one implementation and that the operations of the method 1600 may be rearranged or otherwise modified such that other implementations are possible.

In some embodiments, aspects of the methods 1300, 1400, 1500, and/or 1600 described with reference to FIGS. 13, 14, 15, and/or 16 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, at least one microprocessor in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:
1. A method for wireless communication, comprising:
  receiving, at a Wi-Fi docking center (WDC), a request regarding one or more peripheral function protocols (PFPs) supported by the WDC;
  transmitting a response message indicating whether the WDC supports at least a Wi-Gig Bus Extension as a PFP, or a Wi-Gig Display Extension as a PFP, or a combination thereof;
  determining whether a particular PFP supported by the WDC is deployed using a Wi-Fi direct services (WFDS) application services platform (ASP); and
  upon determining that the particular PFP supported by the WDC is not deployed using the WFDS ASP, setting a value of a service information element to a null value.

2. The method of claim 1, wherein the response message comprises a data type field, the data type field comprising a value representing a PFP supported by the WDC.

3. The method of claim 2, wherein the value of the data type field comprises an indication that the WDC supports the Wi-Gig Bus Extension as a PFP.

4. The method of claim 2, wherein the value of the data type field comprises an indication that the WDC supports the Wi-Gig Display Extension as a PFP.

5. The method of claim 1, wherein the response message comprises a simple information element or a detailed information element.

6. The method of claim 5, wherein the simple information element comprises a list of PFPs supported by the WDC.

7. The method of claim 5, wherein the detailed information element comprises a list of PFPs supported by the WDC and additional information regarding the particular PFP supported by the WDC.

8. The method of claim 7, wherein the detailed information element further comprises a discovery information subelement.

9. The method of claim 8, wherein the discovery information subelement comprises at least one member in the group consisting of the service information element, a network role information element, an advertisement identification information element, and a service name information element.

10. The method of claim 1, further comprising:
  upon determining that the particular PFP supported by the WDC is deployed using the WFDS ASP, setting a value of the service information element to a non-null value.

11. The method of claim 10, wherein the non-null value is the same value as a service information attribute of the WFDS ASP.

12. The method of claim 9, further comprising:
  setting a value of the advertisement identification information element to an WFDS advertisement identification of the particular PFP.

13. The method of claim 9, further comprising:
  setting a value of the service name information element to a full service name of the WFDS ASP.

14. The method of claim 9, further comprising:
  setting the network role information element to a first value when the WDC intends to assume a network role of a group owner of a peer-to-peer session providing the particular PFP; and
  setting the network role information element to a second value when the WDC intends to assume a network role of a client in the peer-to-peer session providing the particular PFP.

15. An apparatus for wireless communication, comprising:
  means for receiving, at a Wi-Fi docking center (WDC), a request regarding one or more peripheral function protocols (PFPs) supported by the WDC;
  means for transmitting a response message indicating whether the WDC supports at least a Wi-Gig Bus Extension as a PFP, or a Wi-Gig Display Extension as a PFP, or a combination thereof;
  means for determining whether a particular PFP supported by the WDC is deployed using a Wi-Fi direct services (WFDS) application services platform (ASP); and
  means for setting a value of a service information element to a null value upon determining that the particular PFP supported by the WDC is not deployed using the WFDS ASP.

16. The apparatus of claim 15, wherein the response message comprises a data type field, the data type field comprising a value representing a PFP supported by the WDC.

17. The apparatus of claim 16, wherein the value of the data type field comprises an indication that the WDC supports the Wi-Gig Bus Extension as a PFP.

18. The apparatus of claim 16, wherein the value of the data type field comprises an indication that the WDC supports the Wi-Gig Display Extension as a PFP.

19. The apparatus of claim 15, wherein the response message comprises a simple information element or a detailed information element.

20. The apparatus of claim 19, wherein the simple information element comprises a list of PFPs supported by the WDC.

21. The apparatus of claim 19, wherein the detailed information element comprises a list of PFPs supported by the WDC and additional information regarding the particular PFP supported by the WDC.

22. The apparatus of claim 21, wherein the detailed information element further comprises a discovery information subelement.

23. The apparatus of claim 22, wherein the discovery information subelement comprises at least one member in the group consisting of the service information element, a network role information element, an advertisement identification information element, and a service name information element.

24. The apparatus of claim 15, further comprising:
means for, upon determining that the particular PFP supported by the WDC is deployed using the WFDS ASP, setting a value of the service information element to a non-null value.

25. The apparatus of claim 24, wherein the non-null value is the same value as a service information attribute of the WFDS ASP.

26. The apparatus of claim 23, further comprising:
means for setting a value of the advertisement identification information element to an WFDS advertisement identification of the particular PFP.

27. The apparatus of claim 23, further comprising:
means for setting a value of the service name information element to a full service name of the WFDS ASP.

28. The apparatus of claim 23, further comprising:
means for setting the network role information element to a first value when the WDC intends to assume a network role of a group owner of a peer-to-peer session providing the particular PFP; and
means for setting the network role information element to a second value when the WDC intends to assume a network role of a client in the peer-to-peer session providing the particular PFP.

29. An apparatus for wireless communication, comprising:
a processor;
memory in electronic communication with the processor; and
instructions stored in the memory, the instructions being executable by the processor to:
receive, at a Wi-Fi docking center (WDC), a request regarding one or more peripheral function protocols (PFPs) supported by the WDC;
transmit a response message indicating whether the WDC supports at least a Wi-Gig Bus Extension as a PFP, or a Wi-Gig Display Extension as a PFP, or a combination thereof;
determine whether a particular PFP supported by the WDC is deployed using a Wi-Fi direct services (WFDS) application services platform (ASP); and
upon determining that the particular PFP supported by the WDC is not deployed using the WFDS ASP, set a value of a service information element to a null value.

30. The apparatus of claim 29, wherein the response message comprises a data type field, the data type field comprising a value representing a PFP supported by the WDC.

31. The apparatus of claim 29, wherein the response message comprises a simple information element or a detailed information element.

32. The apparatus of claim 31, wherein the simple information element comprises a list of PFPs supported by the WDC.

33. The apparatus of claim 31, wherein the detailed information element comprises a list of PFPs supported by the WDC and additional information regarding Rail the particular PFP supported by the WDC.

34. The apparatus of claim 33, wherein the detailed information element further comprises a discovery information subelement.

35. The apparatus of claim 34, wherein the discovery information subelement comprises at least one member in the group consisting of the service information element, a network role information element, an advertisement identification information element, and a service name information element.

36. The apparatus of claim 29, wherein the instructions are executable by the processor to:
upon determining that the particular PFP supported by the WDC is deployed using the WFDS ASP, set a value of the service information element to a non-null value.

37. The apparatus of claim 36, wherein the non-null value is the same value as a service information attribute of the WFDS ASP.

38. The apparatus of claim 35, wherein the instructions are executable by the processor to:
set the network role information element to a first value when the WDC intends to assume a network role of a group owner of a peer-to-peer session providing the particular PFP; and
set the network role information element to a second value when the WDC intends to assume a network role of a client in the peer-to-peer session providing the particular PFP.

39. A computer program product for wireless communication, the computer program product comprising a non-transitory computer-readable medium storing instructions executable by a processor to:
receive, at a Wi-Fi docking center (WDC), a request regarding one or more peripheral function protocols (PFPs) supported by the WDC;
transmit a response message indicating whether the WDC supports at least a Wi-Gig Bus Extension as a PFP, or a Wi-Gig Display Extension as a PFP, or a combination thereof;
determine whether a particular PFP supported by the WDC is deployed using a Wi-Fi direct services (WFDS) application services platform (ASP); and
upon determining that the particular PFP supported by the WDC is not deployed using the WFDS ASP, set a value of a service information element to a null value.

40. The computer program product of claim 39, wherein the response message comprises a simple information element or a detailed information element, the simple information element comprising a list of PFPs supported by the WDC, the detailed information element comprising the list of PFPs supported by the WDC and additional information regarding the particular PFP supported by the WDC.

41. The computer program product of claim 40, wherein the detailed information element comprises a discovery information subelement, the discovery information subelement comprising at least one member in the group consisting of the service information element, a network role information element, an advertisement identification information element, and a service name information element.

42. The computer program product of claim 41, wherein the instructions are executable by the processor to:
set the network role information element to a first value when the WDC intends to assume a network role of a group owner of a peer-to-peer session providing the particular PFP; and
set the network role information element to a second value when the WDC intends to assume a network role of a client in the peer-to-peer session providing the particular PFP.

43. A method for wireless communication, comprising:
transmitting a request to a Wi-Fi docking center (WDC) regarding one or more peripheral function protocols (PFPs) supported by the WDC, the request being transmitted using a first peer-to-peer (P2P) connection;
receiving a response message from the WDC, the response message indicating whether the WDC supports at least a Wi-Gig Bus Extension as a PFP, or a Wi-Gig Display Extension as a PFP, or a combination thereof;
determining whether a particular PFP supported by the WDC is deployed using a Wi-Fi direct services (WFDS) application services platform (ASP); and
upon determining that the particular PFP supported by the WDC is not deployed using the WFDS ASP, identifying that a value of a service information element is set to a null value.

44. The method of claim 43, further comprising:
selecting the particular PFP supported by the WDC based at least in part on the response message; and
connecting to the particular PFP supported by the WDC.

45. The method of claim 43, wherein the response message comprises a network role information element.

46. The method of claim 45, further comprising:
identifying a value of the network role information element, the value indicating a network role to be assumed by the WDC for the first P2P connection; and
comparing the value of the network role information element to a value of a current network role assumed by a wireless device.

47. The method of claim 46, further comprising:
disconnecting from the first P2P connection; and
establishing a second P2P connection to connect to the particular PFP supported by the WDC when the value of the network role information element matches the value of the current network role assumed by the wireless device.

48. The method of claim 46, further comprising:
using the first P2P connection to connect to the particular PFP supported by the WDC when the value of the network role information element is different than the value of the current network role assumed by the wireless device.

49. An apparatus for wireless communication, comprising:
means for transmitting a request to a Wi-Fi docking center (WDC) regarding one or more peripheral function protocols (PFPs) supported by the WDC, the request being transmitted using a first peer-to-peer (P2P) connection;
means for receiving a response message from the WDC, the response message indicating whether the WDC supports at least a Wi-Gig Bus Extension as a PFP, or a Wi-Gig Display Extension as a PFP, or a combination thereof;
means for determining whether a particular PFP supported by the WDC is deployed using a Wi-Fi direct services (WFDS) application services platform (ASP); and
means for identifying that a value of a service information element is set to a null value, upon determining that the particular PFP supported by the WDC is not deployed using the WFDS ASP.

50. The apparatus of claim 49, further comprising:
means for selecting the particular PFP supported by the WDC based at least in part on the response message; and
means for connecting to the particular PFP supported by the WDC.

51. The apparatus of claim 49, wherein the response message comprises a network role information element.

52. The apparatus of claim 51, further comprising:
means for identifying a value of the network role information element, the value indicating a network role to be assumed by the WDC for the first P2P connection; and
means for comparing the value of the network role information element to a value of a current network role assumed by a wireless device.

53. The apparatus of claim 52, further comprising:
means for disconnecting from the first P2P connection; and
means for establishing a second P2P connection to connect to the particular PFP supported by the WDC when the value of the network role information element matches the value of the current network role assumed by the wireless device.

54. The apparatus of claim 52, further comprising:
means for using the first P2P connection to connect to the particular PFP supported by the WDC when the value of the network role information element is different than the value of the current network role assumed by the wireless device.

55. An apparatus for wireless communication, comprising:
a processor;
memory in electronic communication with the processor; and
instructions stored in the memory, the instructions being executable by the processor to:
transmit a request to a Wi-Fi docking center (WDC) regarding one or more peripheral function protocols (PFPs) supported by the WDC, the request being transmitted using a first peer-to-peer (P2P) connection;
receive a response message from the WDC, the response message indicating whether the WDC supports at least a Wi-Gig Bus Extension as a PFP, or a Wi-Gig Display Extension as a PFP, or a combination thereof;
determine whether a particular PFP supported by the WDC is deployed using a Wi-Fi direct services (WFDS) application services platform (ASP); and upon determining that the particular PFP supported by the WDC is not deployed using the WFDS ASP, identify that a value of a service information element is set to a null value.

56. The apparatus of claim 55, wherein the instructions are executable by the processor to:
select the particular PFP supported by the WDC based at least in part on the response message; and
connect to the particular PFP supported by the WDC.

57. The apparatus of claim 55, wherein the response message comprises a network role information element.

58. The apparatus of claim 57, wherein the instructions are executable by the processor to:
identify a value of the network role information element, the value indicating a network role to be assumed by the WDC for the first P2P connection; and
compare the value of the network role information element to a value of a current network role assumed by a wireless device.

59. The apparatus of claim 58, wherein the instructions are executable by the processor to:
disconnect from the first P2P connection; and
establish a second P2P connection to connect to the particular PFP supported by the WDC when the value of the network role information element matches the value of the current network role assumed by the wireless device.

60. The apparatus of claim 58, wherein the instructions are executable by the processor to:
use the first P2P connection to connect to the particular PFP supported by the WDC when the value of the network role information element is different than the value of the current network role assumed by the wireless device.

61. A computer program product for wireless communication, the computer program product comprising a non-transitory computer-readable medium storing instructions executable by a processor to:
transmit a request to a Wi-Fi docking center (WDC) regarding one or more peripheral function protocols (PFPs) supported by the WDC, the request being transmitted using a first peer-to-peer (P2P) connection;
receive a response message from the WDC, the response message indicating whether the WDC supports at least a Wi-Gig Bus Extension as a PFP, or a Wi-Gig Display Extension as a PFP, or a combination thereof;
determine whether a particular PFP supported by the WDC is deployed using a Wi-Fi direct services (WFDS) application services platform (ASP); and
upon determining that the particular PFP supported by the WDC is not deployed using the WFDS ASP, identify that a value of a service information element is set to a null value.

62. The computer program product of claim 61, wherein the instructions are executable by the processor to:
select the particular PFP supported by the WDC based at least in part on the response message; and
connect to the particular PFP supported by the WDC.

63. The computer program product of claim 61, wherein the response message comprises a network role information element.

64. The computer program product of claim 63, wherein the instructions are executable by the processor to:
identify a value of the network role information element, the value indicating a network role to be assumed by the WDC for the first P2P connection; and
compare the value of the network role information element to a value of a current network role assumed by a wireless device.

* * * * *